(12) United States Patent
Kimura et al.

(10) Patent No.: US 12,521,465 B2
(45) Date of Patent: Jan. 13, 2026

(54) ABSORBENT MATERIAL, WATER ABSORBENT AND METHOD FOR PRODUCING WATER ABSORBENT

(71) Applicant: NIPPON SHOKUBAI CO., LTD., Osaka (JP)

(72) Inventors: Kazuki Kimura, Himeji (JP); Reiko Nakatsuru, Himeji (JP); Daisuke Takeda, Himeji (JP); Yudai Fujii, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 634 days.

(21) Appl. No.: 17/797,495

(22) PCT Filed: Feb. 12, 2021

(86) PCT No.: PCT/JP2021/005153
§ 371 (c)(1),
(2) Date: Aug. 4, 2022

(87) PCT Pub. No.: WO2021/162072
PCT Pub. Date: Aug. 19, 2021

(65) Prior Publication Data
US 2023/0076935 A1    Mar. 9, 2023

(30) Foreign Application Priority Data

Feb. 14, 2020    (JP) ................. 2020-023474

(51) Int. Cl.
*A61L 15/42* (2006.01)
*A61L 15/20* (2006.01)
(Continued)

(52) U.S. Cl.
CPC ............... *A61L 15/42* (2013.01); *A61L 15/20* (2013.01); *B01J 20/267* (2013.01);
(Continued)

(58) Field of Classification Search
CPC ........ A61L 15/42; A61L 15/20; B01J 20/267; B01J 20/28016; B01J 20/28059;
(Continued)

(56) References Cited

U.S. PATENT DOCUMENTS

2007/0066167 A1    3/2007  Wada et al.
2007/0141338 A1    6/2007  Ishizaki et al.
(Continued)

FOREIGN PATENT DOCUMENTS

CN    101501131 A    8/2009
CN    104703690 A    6/2015
(Continued)

OTHER PUBLICATIONS

Third Party Observation for EP Application No. 21752870.2 dated Sep. 11, 2023.
(Continued)

*Primary Examiner* — Jiangtian Xu
(74) *Attorney, Agent, or Firm* — Harness Dickey & Pierce P.L.C.

(57) ABSTRACT

Provided are: a water-absorbing agent achieving, in a balanced manner, both good physical properties and a decrease in speed of coloration with lapse of time even if the water-absorbing agent has a high moisture absorbing speed due to having a large specific surface area; and an absorbent body having a low ratio of pulp and achieving, in a balanced manner, both good physical properties suitable for a thin disposable diaper and a decrease in speed of coloration with lapse of time. The absorbent body contains a hydrophilic base material and a water-absorbing agent which contains: surface-crosslinked water-absorbing resin particles having a non-uniformly pulverized shape; α-hydroxycarboxylic acid (salt); and an aminocarboxylic acid-based chelating agent and/or a phosphorus-based chelating agent, a point plotted (Continued)

along an x-axis that represents an amount ($x_1$ mol %) of α-hydroxycarboxylic acid (salt) extracted from the water-absorbing agent and along a y-axis that represents an amount ($y_1$ mmol %) of an aminocarboxylic acid-based chelating agent and/or a phosphorus-based chelating agent extracted from the water-absorbing agent being within a range that satisfies a specific relational formula of $x_1$ and $y_1$, the water-absorbing agent having a moisture absorbing speed of 120 mg/g/hr or more at a temperature of 40±1° C. at a relative humidity of 75±1% RH.

9 Claims, 3 Drawing Sheets

(51) Int. Cl.
- *B01J 20/26* (2006.01)
- *B01J 20/28* (2006.01)
- *B01J 20/30* (2006.01)
- *C08F 220/06* (2006.01)
- *C08J 3/24* (2006.01)

(52) U.S. Cl.
CPC ... *B01J 20/28016* (2013.01); *B01J 20/28059* (2013.01); *B01J 20/3085* (2013.01); *C08F 220/06* (2013.01); *C08J 3/245* (2013.01); *C08F 2800/20* (2013.01); *C08F 2810/20* (2013.01); *C08J 2333/02* (2013.01)

(58) Field of Classification Search
CPC . B01J 20/3085; C08F 220/06; C08F 2800/20; C08F 2810/20; C08J 3/245; C08J 2333/02

See application file for complete search history.

(56) References Cited

U.S. PATENT DOCUMENTS

| | | |
|---|---|---|
| 2009/0275470 A1 | 11/2009 | Nagasawa et al. |
| 2009/0312183 A1* | 12/2009 | Fujimaru ............. C08F 120/06 502/402 |
| 2009/0318885 A1 | 12/2009 | Dairoku et al. |
| 2015/0258237 A1 | 9/2015 | Machida et al. |
| 2019/0105633 A1 | 4/2019 | Tamaki et al. |
| 2019/0125921 A1 | 5/2019 | Kimura et al. |

FOREIGN PATENT DOCUMENTS

| | | |
|---|---|---|
| CN | 105658323 A | 6/2016 |
| EP | 3056268 A1 | 8/2016 |
| JP | 2000-327926 A | 11/2000 |
| JP | 2005-186016 A | 7/2005 |
| JP | 2008-535640 A | 9/2008 |
| JP | 2012-143755 A | 8/2012 |
| WO | 2005/012369 A1 | 2/2005 |
| WO | 2008/026772 A1 | 3/2008 |
| WO | 2009/005114 A1 | 1/2009 |
| WO | 2011/040530 A1 | 4/2011 |
| WO | 2017/170501 A1 | 10/2017 |
| WO | 2017/170604 A1 | 10/2017 |

OTHER PUBLICATIONS

Sapoundjiev, 2007 (p. 68, tbl. 6-1).
Sapoundjiev Dissertation, 2007.
Office Action from Chinese application No. 202180013277.6 dated Mar. 30, 2024.
Written Opinion for PCT/JP2021/005153 (International Preliminary Report on Patentability).
International Search Report for PCT/JP2021/005153.
Office Action from Chinese Application No. 202180013277.6 dated Nov. 30, 2024.

* cited by examiner

ABSORBENT MATERIAL, WATER ABSORBENT AND METHOD FOR PRODUCING WATER ABSORBENT

PRIORITY STATEMENT

This application is a national stage application under 35 U.S.C. § 371 of PCT International Application No. PCT/JP2021/005153, which has an international filing date of 12 Feb. 2021 and claims priority under 35 U.S.C. § 119 to Japanese Patent Application No. 2020-023474 filed on 14 Feb. 2020. The contents of each application recited above are incorporated herein by reference in their entirety.

TECHNICAL FIELD

The present invention relates to an absorbent body, a water-absorbing agent, and a method for producing the water-absorbing agent.

BACKGROUND ART

In recent years, there has been an increasing tendency to reduce the thickness of a sanitary material, such as a disposable diaper, for all ages including children and adults and for all applications including light incontinence, and a ratio of an absorbing agent (or a water-absorbing resin) in an absorbent body of the sanitary material is ever increasing. Generally, the absorbent body is formed from a mixture (and/or a composite) of a water-absorbing agent and wood-ground pulp. The wood-ground pulp is white hydrophilic fibers mainly composed of cellulose. Before absorbing urine during actual use, the wood-ground pulp has an effect of adjusting humidity inside a disposable diaper to prevent or reduce, a damp feel experienced by a wearer. Further, when the absorbent body is contained in a disposable diaper, the wood-ground pulp has an effect of quickly taking urine immediately after urination into the absorbent body and diffusing the urine throughout the absorbent body. However, a decrease in ratio of pulp with the recent reduction in thickness, and further, the advent of a disposable diaper that employs a pulp-free absorbent body, have led to a need of a water-absorbing agent to take, on the above-described functions (a humidity adjusting function, a liquid trapping function, and a diffusion function) for which pulp has been responsible in a disposable diaper and an absorbent body. As such, development is underway for a multifunctional water-absorbing agent that has various good water absorption physical properties (for example, absorption capacity without load (CRC), absorption capacity under load (AAP), saline flow conductivity (SFC), and absorption speed (Vortex, FSR)). For example, there has been developed a water-absorbing agent that is improved in Vortex and FSR by having an increased specific surface area while maintaining performance in CRC, AAP, and SFC. Accordingly, an absorbent body containing the water-absorbing agent has a humidity adjusting function and water absorption physical properties even if the absorbent body has a reduced ratio of pulp due to the reduction in thickness. Such an absorbent body has been put to practical use.

In some cases, depending on conditions in which a water-absorbing agent to be used is stored and transported, a manner of handling an absorbent body in which a water-absorbing agent is used together with pulp, an adhesive, and the like, and conditions in which a disposable diaper containing an absorbent body is stored, the absorbent bodies and the water-absorbing agents may be exposed for a long time in an environment with a high temperature and a high humidity. This may cause the absorbent bodies and the water-absorbing agents to undergo coloration with lapse of time by absorbing moisture. In particular, an absorbent body having a low ratio of pulp has a smaller amount of white hydrophilic fibers, so that, for example, a water-absorbing agent that has become colored dominates the color of the absorbent body; and the absorbent body thus colored becomes visible through a top sheet of the disposable diaper. This may result in a complaint by a consumer. As a way to reduce such coloration with lapse of time of an absorbent body, and further to reduce a speed of coloration with lapse of time of a water-absorbing agent, for example, Patent Literatures 1 to 5 below each propose a water-absorbing agent.

CITATION LIST

Patent Literature

[Patent Literature 1]
  WO2008/026772
[Patent Literature 2]
  WO2017/170604
[Patent Literature 3]
  WO2005/012369
[Patent Literature 4]
  Japanese Patent Application Publication Tokukai No. 2000-327926
[Patent Literature 5]
  Japanese Patent Application Publication Tokukai No. 2005-186016

SUMMARY OF INVENTION

Technical Problem

However, a water-absorbing agent developed in order to improve performance of an absorbent body for use in a thin disposable diaper tends to also have an increased moisture absorbing speed, which, though positively affecting a humidity adjusting function of the absorbent body, leads to an increase in speed of coloration with lapse of time of the water-absorbing agent. A conventional coloration-preventing technology was applied to a water-absorbing agent for use in a disposable diaper having a reduced ratio of pulp in the absorbent body due to the reduction in thickness, but it was difficult to suppress an increase in speeds of coloration with lapse of time of the absorbent body and the water-absorbing agent.

In view, of the above, a object is to provide: an absorbent body that has a low ratio of pulp and that not only enables a good humidity condition inside a disposable diaper before absorption of urine but also, while maintaining water absorption physical properties, undergoes less increase in speed of coloration with lapse of time; and a water-absorbing agent suitable for the absorbent body.

Another object is to provide a water-absorbing agent that achieves, in a balanced manner, both good water absorption physical properties (CRC, AAP, SFC, moisture absorbing speed) and less increase in speed of coloration with lapse of time even if the water-absorbing agent has an increased moisture absorbing speed due to having a large specific surface area, and further to provide an absorbent body that has a low ratio of pulp and that achieves, in a balanced manner, both physical properties (i.e., having a function of adjusting the humidity inside a disposable diaper, a liquid trapping function, and a diffusion function and being capable of maintaining good water absorption physical properties) suitable for a thin disposable diaper and less increase in speed of coloration with lapse of time.

Solution to Problem

As a result of conducting diligent research in order to attain the object, the inventors of the present invention have found that the following absorbent materials and water-absorbing agents make it possible to attain the object, and thus completed the present invention.

That is, an embodiment of the present invention includes the following aspects.

[A] An absorbent body, containing a hydrophilic base material and a water-absorbing agent,
the water-absorbing agent containing surface-crosslinked water-absorbing resin particles having a non-uniformly pulverized shape,
a point plotted along an x-axis that represents an amount ($x_1$ mol %) of α-hydroxycarboxylic acid (salt) extracted from the water-absorbing agent and along a y-axis that represents an amount ($y_1$ mmol %) of an aminocarboxylic acid-based chelating agent and/or a phosphorus-based chelating agent extracted from the water-absorbing agent being within a range defined by (a) or (b) below,
the water-absorbing agent having a moisture absorbing speed of 120 mg/g/hr or more at a temperature of 40±1° C. at a relative humidity of 75±1% RH,
(a) $0 \leq x_1 < 0.19$ and both of the following Formulae (1) and (2) are satisfied:

$$y_1 > 28.7x_1^2 - 11.1x_1 + 1.07 \qquad \text{Formula(1)}$$

$$y_1 \geq 0 \qquad \text{Formula (2)}$$

(b) $0.19 \leq x_1 \leq 0.33$ and the following Formula (2) is satisfied:

$$y_1 \geq 0 \qquad \text{Formula (2).}$$

[B] An absorbent body, containing a hydrophilic base material and a water-absorbing agent,
the water-absorbing agent containing surface-crosslinked water-absorbing resin particles having a non-uniformly pulverized shape,
a point plotted along an x-axis that represents an amount ($x_1$ mol %) of α-hydroxycarboxylic acid (salt) extracted from the water-absorbing agent and along a y-axis that represents an amount ($y_1$ mmol %) of an aminocarboxylic acid-based chelating agent and/or a, phosphorus-based chelating agent extracted from the water-absorbing agent being within a range defined by (a) or (b) below,
the water-absorbing agent having a specific surface area of 32 m²/kg or more,
(a) $0 \leq x_1 < 0.19$ and both of the following Formulae (1) and (2) are satisfied:

$$y_1 > 28.7x_1^2 - 11.1x_1 + 1.07 \qquad \text{Formula(1)}$$

$$y_1 \geq 0 \qquad \text{Formula (2)}$$

(b) $0.19 \leq x_1 \leq 0.33$ and the following Formula (2) is satisfied:

$$y_1 \geq 0 \qquad \text{Formula (2)}$$

[C] The absorbent body according to [A] or [B], wherein a ratio of a mass of the water-absorbing agent to a mass of the absorbent body is 75 mass % or more and 99% by mass or less.

[D] An absorbent article, including an absorbent body recited in any one of [A] to [C].

[E] A water-absorbing agent, containing surface-crosslinked water-absorbing resin particles having a non-uniformly pulverized shape,
a point plotted along an x-axis that represents an amount ($x_1$ mol %) of α-hydroxycarboxylic acid (salt) extracted from the water-absorbing agent and along a y-axis that represents an amount ($y_1$ mmol %) of an aminocarboxylic acid-based chelating agent and/or a phosphorus-based chelating agent extracted from the water-absorbing agent being within a range defined by (a) or (b) below,
the water-absorbing agent having a moisture absorbing speed of 120 mg/g/hr or more at a temperature of 40±1° C. at a relative humidity of 75±1% RH,
(a) $0 \leq x_1 < 0.19$ and both of the following Formulae (1) and (2) are satisfied:

$$y_1 > 28.7x_1^2 - 11.1x_1 + 1.07 \qquad \text{Formula(1)}$$

$$y_1 \geq 0 \qquad \text{Formula (2)}$$

(b) $0.19 \leq x_1 \leq 0.33$ and the following Formula (2) is satisfied:

$$y_1 \geq 0 \qquad \text{Formula (2)}$$

[F] A water-absorbing agent, containing surface-crosslinked water-absorbing resin particles having a non-uniformly pulverized shape,
a point plotted along an x-axis that represents an amount ($x_1$ mol %) of α-hydroxycarboxylic acid (salt) extracted from the water-absorbing agent and along a y-axis that represents an amount ($y_1$ mmol %) of an aminocarboxylic acid-based chelating agent and/or a phosphorus-based chelating agent extracted from the water-absorbing agent being within a range defined by (a) or (b) below,
the water-absorbing agent having a specific surface area of 32 m²/kg or more,
(a) $0 \leq x_1 < 0.19$ and both of the following Formulae (1) and (2) are satisfied:

$$y_1 > 28.7x_1^2 - 11.1x_1 + 1.07 \qquad \text{Formula(1)}$$

$$y_1 \geq 0 \qquad \text{Formula (2)}$$

(b) $0.19 \leq x_1 \leq 0.33$ and the following Formula (2) is satisfied:

$$y_1 \geq 0 \qquad \text{Formula (2)}$$

[G] The water-absorbing agent according to [E] or [F], wherein an amount of change between a WI value before a coloration test and a WI value after the coloration test is 40 or less, and the WI value before the coloration test is 42 or more,
the coloration test being a test in which the water-absorbing agent is exposed for 7 days in an environment where a temperature is 70±1° C. and a relative humidity is 75±1% RH.

[H] The water-absorbing agent according to any one of [E] to [G], wherein the water-absorbing agent satisfies a relational formula of Formula (3) and/or a relational formula of Formula (4):

$$y_2 \geq 0.24x_2 + 18 \qquad (3)$$

$$z_2 \geq -10x_2 + 306 \qquad (4)$$

where $x_2$ represents CRC, $y_2$ represents AAP; $z_2$ represents SFC, and $x_2$ is a value of 26 or more and 32 or less.

[I] A method for producing a water-absorbing agent containing surface-crosslinked water-absorbing resin particles having a non-uniformly pulverized shape, the method including:

a preparation step of preparing an aqueous monomer solution containing a monomer and at least one polymerizable internal crosslinking agent, the monomer containing acrylic acid (salt) as a main component, the preparation step including: adding, to the aqueous monomer solution, α-hydroxycarboxylic acid (salt), and an aminocarboxylic acid-based chelating agent and/or a phosphorus-based chelating agent such that a point plotted along an x-axis that represents an amount ($x_1$ mol %) of the α-hydroxycarboxylic acid (salt) extracted from the water-absorbing agent and along a y-axis that represents an amount ($y_1$ mmol %) of the aminocarboxylic acid-based chelating agent and/or the phosphorus-based chelating agent extracted from the water-absorbing agent is within a range defined by (a) or (b) below; and adjusting the water-absorbing agent to have a moisture absorbing speed of 120 mg/g/hr or more at a temperature of 40±1° C. at a relative humidity of 75±1% RH, (a) $0 \le x_1 < 0.19$ and both of the following Formulae (1) and (2) are satisfied:

$$y_1 > 28.7x_1^2 - 11.1x_1 + 1.07 \quad \text{Formula(1)}$$

$$y_1 \ge 0 \quad \text{Formula (2)}$$

(b) $0.19 \le x_1 \le 0.33$ and the following Formula (2) is satisfied:

$$y_1 \ge 0 \quad \text{Formula (2)}$$

[J] A method for producing a water-absorbing agent containing surface-crosslinked water-absorbing resin particles having a non-uniformly pulverized shape, the method including:

a preparation step of preparing an aqueous monomer solution containing a monomer and at least one polymerizable internal crosslinking agent the monomer containing acrylic acid (salt) as a main component, the preparation step including: adding to the aqueous monomer solution, α-hydroxycarboxylic acid (salt), and an aminocarboxylic acid-based chelating agent and/or a phosphorus-based chelating agent such that a point plotted along an x-axis that represents an amount ($x_1$ mol %) of the α-hydroxycarboxylic acid (salt) extracted from the water-absorbing agent and along a y-axis that represents an amount ($y_1$ mmol %) of the aminocarboxylic acid-based chelating agent and/or the phosphorus-based chelating agent extracted from the water-absorbing agent is within a range defined by (a) or (b) below; and adjusting the water-absorbing agent to have a specific surface area of 32 m²/kg or more, (a) $0 \le x_1 < 0.19$ and both of the following Formulae (1) and (2) are satisfied:

$$y_1 > 28.7x_1^2 - 11.1x_1 + 1.07 \quad \text{Formula(1)}$$

$$y_1 \ge 0 \quad \text{Formula (2)}$$

(b) $0.19 \le x_1 \le 0.33$ and the following Formula (2) is satisfied:

$$y_1 \ge 0 \quad \text{Formula (2)}$$

[K] The method according to [I] or [J], further including the step of:

in a case where the respective amounts of the α-hydroxycarboxylic acid (salt), and the aminocarboxylic acid-based chelating agent and/or the phosphorus-based chelating agent extracted from the water-absorbing agent containing the surface-crosslinked water-absorbing resin particles having the non-uniformly pulverized shape are not in the range defined by (a) or (b) below, adding the α-hydroxycarboxylic acid (salt), and the aminocarboxylic acid-based chelating agent and/or the phosphorus-based chelating agent to the water-absorbing agent such that the amounts are within the range, (a) $0 \le x_1 < 0.19$ and both of the following Formulae (1) and (2) are satisfied:

$$y_1 > 28.7x_1^2 - 11.1x_1 + 1.07 \quad \text{Formula(1)}$$

$$y_1 \ge 0 \quad \text{Formula (2)}$$

(b) $0.19 \le x_1 \le 0.33$ and the following Formula (2) is satisfied:

$$y_1 \ge 0 \quad \text{Formula (2)}$$

[L] The method according to any one of [I] to [K], further including the step of:

controlling a specific surface area of the water-absorbing agent before surface-crosslinking to be 32 m²/kg or more.

Advantageous Effects of Invention

The present invention, when applied to an absorbent body having a low ratio of pulp, makes it possible to provide an absorbent body that has a low ratio of pulp, is suitable for a thin disposable diaper, and can not only reduce discomfort of a wearer of a disposable diaper before absorption of urine by adjusting humidity inside the disposable diaper but also achieve, in a balanced manner, both good water absorption physical properties and less increase in speed of coloration with lapse of time. Further, the present invention makes it possible to provide a water-absorbing agent that achieves, in a balanced manner, both good water absorption physical properties (CRC, AAP, SFC, absorption speed) and less increase in speed of coloration with lapse of time.

DESCRIPTION OF EMBODIMENTS

Figure 1:
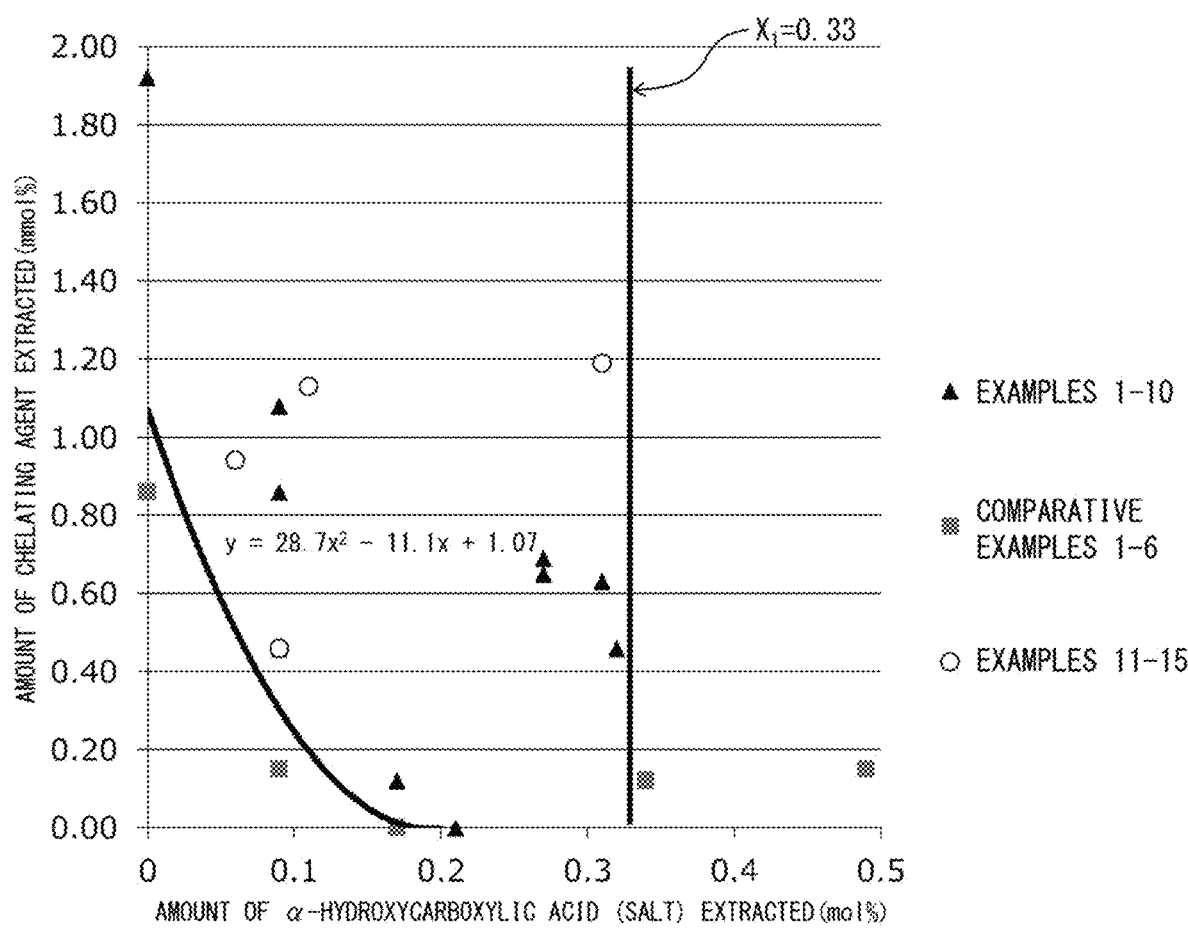
FIG. 1 is a graph showing a relationship between an amount of α-hydroxycarboxylic acid (salt) extracted and an amount of an aminocarboxylic acid-based chelating agent or a phosphorus-based chelating agent extracted in accordance with Examples and Comparative Examples of the present invention.

The following description will discuss an embodiment of the present invention. Note, however, that the present invention is not limited to such an embodiment. The present invention is not limited to the description of the arrangements below, but may be altered in various ways within the scope of the claims. The present invention also encompasses, in its technical scope, any embodiments and examples derived by combining technical means disclosed in differing embodiments and examples. All of the documents cited herein are incorporated herein by reference. In the present specification, any numerical range "A to B" means "not less than A and not more than B".

[1] Definitions of Terms

[1-1] Water-Absorbing Agent

In the present specification, the term "water-absorbing agent" refers to a polymer gelling agent having a water-swelling property and a water-insolubility, and the water-absorbing agent is generally particulate. Further, the term "water-swelling property" refers to an absorption capacity without load (CRC) as defined in NWSP 241.0.R2 (15) of 5 g/g or more, and the term "water-insolubility" refers to a soluble content (Ext) as defined in NWSP 270.0.R2 (15) of 50 mass % or less. Note that the term "CRC" is an acronym for centrifuge retention capacity and means an absorption capacity of a water-absorbing agent without load.

The "water-absorbing agent" contains, as a main component, a hydrophilic crosslinked polymer that is preferably a hydrophilic crosslinked polymer obtained by crosslinking and polymerizing unsaturated monomers (hereinafter referred to as "carboxyl group-containing unsaturated monomers") each of which has a carboxyl group. As described above, a crosslinked polymer is typically in the form of particles. Accordingly, a hydrophilic crosslinked polymer is water-absorbing resin particles, which are in the form of particles. Note, however, that the water-absorbing agent is not necessarily wholly (that is, 100 mass %) a crosslinked polymer (water-absorbing resin particles), and can contain an additive and/or the like to the extent that the above-described performance such as CRC and Ext is maintained. A content of the water-absorbing resin particles in the water-absorbing agent can be 90 mass % or more, 95 mass % or more, or 99 mass % or more.

For example, 1 mass % or more, 10 mass % or more, 20 mass % or more, 30 mass % or more, 40 mass % or more, 50 mass % or more, 60 mass % or more, 70 mass % or more, 80 mass % or more, 90 mass % or more, or 100 mass % of a total amount of monomer(s) constituting the crosslinked polymer can be the carboxyl group-containing unsaturated monomers.

In some cases, the term "water-absorbing agent" may refer to resin particles (polymer) which are crosslinked only internally (that is, resin particles (polymer) in which an internal crosslinking density and a surface crosslinking density are substantially the same) or resin particles (polymer) whose insides and surfaces are both crosslinked (that is, resin particles (polymer) in which a surface crosslinking density is higher relative to the internal crosslinking density thereof).

In the present specification, the "resin particles (polymer) which are crosslinked only internally" and the "resin particles (polymer) whose insides and surfaces are both crosslinked" are not distinguished in principle, and are both expressed as "water-absorbing agent". Note, however, that if the "resin particles (polymer) which are crosslinked only internally" and the "resin particles (polymer) whose insides and surfaces are both crosslinked" need to be clearly distinguished in terms of having been surface-crosslinked or not, the "resin particles (polymer) which are crosslinked only internally", which are resin particles (polymer) before being surface-crosslinked, are thus expressed as "water-absorbing agent before surface-crosslinking", and the "resin particles (polymer) whose insides and surfaces are both crosslinked", which are resin particles (polymer) after having been surface-crosslinked, are thus expressed as "water-absorbing agent after surface-crosslinking" or "surface-crosslinked water-absorbing agent". Note that the phrase "before surface-crosslinking" means "before a surface-crosslinking agent is added" or "before a crosslinking reaction caused by a heating treatment starts even after a surface-crosslinking agent has been added".

Further, the term "water-absorbing agent" may refer to only a resin component (water-absorbing resin particles) and may also refer to a resin containing a component other than the resin, such as an additive.

[1-2] Acrylic Acid (Salt)-Based Monomer and Polyacrylic Acid (Salt)-Based Water-Absorbing Agent In the present specification, the term "acrylic acid (salt)" means acrylic acid and/or a salt thereof, and the term "acrylic acid (salt)-based monomer" means a monomer that contains acrylic acid (salt) in an amount of 50 mol % or more, relative to a total amount of monomer(s) excluding a crosslinking agent.

In the present specification, the term "polyacrylic acid (salt)-based water-absorbing agent" means a polymer a raw material of which is acrylic acid (salt). In other words, the "polyacrylic acid (salt)-based water-absorbing agent" is a polymer that has a structural unit derived from acrylic acid (salt) and that has a graft component as an optional component.

Specifically, the polyacrylic acid (salt)-based water-absorbing agent is a carboxyl group-containing unsaturated polymer that contains, relative to a part of monomers excluding an internal crosslinking agent and contributing to a polymerization reaction, acrylic acid (salt) in the following proportions: preferably 50 mol % or more, more preferably 70 mol % or more, even more preferably 90 mol % or more, preferably 100 mol % or less, and particularly preferably substantially 100 mol %.

[1-3] "NWSP"

"NWSP" is an acronym for Non-Woven Standard Procedures—Edition 2015, which is methods standardized in Europe and the United States and co-published by European Disposables and Nonwovens Associations (EDANA) and Association of the Nonwoven Fabrics Industry (INDA) for evaluating nonwoven fabrics and products made of nonwoven fabrics. NWSP also indicates standard measurement methods for a water-absorbing resin. In the present specification, physical properties of a water-absorbing resin are measured in conformity with the NWSP master copy (2015).

In the present specification, measurement methods for various physical properties of a water-absorbing agent are carried out in accordance with measurement methods in Examples below, unless otherwise mentioned.

[1-4] Others

In the present specification, the term "XX acid (salt)" means "XX acid and/or a salt thereof", and the term "(meth)acrylic" means "acrylic and/or methacrylic".

[2] Water-Absorbing Agent

A water-absorbing agent in accordance with an embodiment of the present invention is a surface-crosslinked water-absorbing agent which has a non-uniformly pulverized shape and which, when left to stand still in an environment with a temperature of 40±1° C. and a relative humidity of 75±1% RH, has a moisture absorbing speed of 120 mg/g/hr or more, wherein a point plotted along an x-axis that represents an amount ($x_1$ mol %) of α-hydroxycarboxylic acid (salt) extracted from the water-absorbing agent and along a y-axis that represents an amount ($y_1$ mmol %) of an aminocarboxylic acid-based chelating agent and/or a phosphorus-based chelating agent extracted from the water-absorbing agent is within a range defined by Formulae (A) and (B):

$$y_1 \geq 0 \qquad \text{Formula (A)}$$

$$0 \leq x_1 \leq 0.33 \qquad \text{Formula (B)},$$

excluding a range defined by $y_1 \leq 28.7x_1^2 - 11.1x_1 + 1.07$ and $0 \leq x_1 < 0.19$.

A water-absorbing agent in accordance with an embodiment of the present invention is a water-absorbing agent containing surface-crosslinked water-absorbing resin particles having a non-uniformly pulverized shape, a point plotted along an x-axis that represents an amount ($x_1$ mol %) of α-hydroxycarboxylic acid (salt) extracted from the water-absorbing agent and along a y-axis that represents an amount ($y_1$ mmol %) of an aminocarboxylic acid-based chelating agent and/or a phosphorus-based chelating agent extracted from the water-absorbing agent being within a range defined by (a) or (b) below, the water-absorbing agent having a moisture absorbing speed of 120 mg/g/hr or more at a temperature of 40±1° C. at a relative humidity of 75±1% RH, (a) $0 \leq x_1 < 0.19$ and both of the following Formulae (1) and (2) are satisfied:

$$y_1 > 28.7x_1^2 - 11.1x_1 + 1.07 \qquad \text{Formula(1)}$$

$$y_1 \geq 0 \qquad \text{Formula (2)}$$

(b) $0.19 \leq x_1 \leq 0.33$ and the following Formula (2) is satisfied:

$$y_1 \geq 0 \qquad \text{Formula (2)}$$

Further, a water-absorbing agent in accordance with another embodiment of the present invention is a surface-crosslinked water-absorbing agent which has a non-uniformly pulverized shape and which has a specific surface area of 32 m²/kg or more, wherein a point plotted along an x-axis that represents an amount ($x_1$ mol %) of α-hydroxycarboxylic acid (salt) extracted from the water-absorbing agent and along a y-axis that represents an amount ($y_1$ mmol %) of an aminocarboxylic acid-based chelating agent and/or a phosphorus-based chelating agent extracted from the water-absorbing agent is within a range defined by Formulae (A) and (B):

$$y_1 \geq 0 \qquad \text{Formula (A)}$$

$$0 \leq x_1 \leq 0.33 \qquad \text{Formula (B)},$$

excluding a range defined by $y_1 \leq 28.7x_1^2 - 11.1x_1 + 1.07$ and $0 \leq x_1 < 0.19$.

A water-absorbing agent in accordance with an embodiment of the present invention is a water-absorbing agent containing surface-crosslinked water-absorbing resin particles having a non-uniformly pulverized shape, a point plotted along an x-axis that represents an amount ($x_1$ mol %) of α-hydroxycarboxylic acid (salt) extracted from the water-absorbing agent and along a y-axis that represents an amount ($y_1$ mmol %) of an aminocarboxylic acid-based chelating agent and/or a phosphorus-based chelating agent extracted from the water-absorbing agent being within a range defined by (a) or (b) below, the water-absorbing agent having a specific surface area of 32 m²/kg or more, (a) $0 \leq x_1 < 0.19$ and both of the following Formulae (1) and (2) are satisfied:

$$y_1 > 28.7x_1^2 - 11.1x_1 + 1.07 \qquad \text{Formula(1)}$$

$$y_1 \geq 0 \qquad \text{Formula (2)}$$

(b) $0.19 \leq x_1 \leq 0.33$ and the following Formula (2) is satisfied:

$$y_1 \geq 0 \qquad \text{Formula (2)}$$

In Formula (A), an upper limit value of $y_1$ is not limited, and can be, for example, 10.00 mmol %, 5.00 mmol %, 3.00 mmol %, or 2.00 mmol %

In Formula (2), an upper limit value of $y_1$ is not limited, and can be, for example, 10.00 mmol %, 5.00 mmol %, 3.00 mmol %, or 2.00 mmol %

Each of the above ranges expressed by formulae combining $x_1$ and $y_1$ is empirical formulae derived from a range that has been found to be a range in which good water absorption physical properties are maintained while a main object of the present invention, that is, suppressing an increase in speed of coloration with lapse of time, is achieved.

A surface-crosslinked water-absorbing agent in accordance with an embodiment of the present invention has a large specific surface area and a high moisture absorbing speed and thus, when applied to an absorbent body having a low ratio of pulp, can not only reduce discomfort of a wearer of a disposable diaper before absorption of urine by being able to adjust humidity inside the disposable diaper but also achieve, in a balanced manner, both good physical properties and a decrease in speed of coloration with lapse of time. As such, a surface-crosslinked water-absorbing agent in accordance with an embodiment of the present invention can have a moisture absorbing speed of 120 mg/g/h or more, 135 mg/g/h or more, or 150 mg/g/h or more. An upper limit value of a moisture absorbing speed of a surface-crosslinked water-absorbing agent in accordance with an embodiment of the present invention is not particularly limited, and can be, for example, 190 mg/g/h or less, 175 mg/g/h or less, or 160 mg/g/h or less. In a case where the water-absorbing agent has a moisture absorbing speed of 120 mg/g/h or more, the water-absorbing agent can, when applied to an absorbent body having a low ratio of pulp, reduce discomfort of a wearer of a disposable diaper before absorption of urine by being able to adjust humidity inside the disposable diaper.

Further, a surface-crosslinked water-absorbing agent in accordance with an embodiment of the present invention can have a specific surface area of 32 m²/kg or more, 36 m²/kg or more, 40 m²/kg or more, 44 m²/kg or more, 48 m²/kg or more, 52 m²/kg or more, 56 m²/kg or more, or 60 m²/kg or more. An upper limit value of a specific surface area of a surface-crosslinked water-absorbing agent in accordance with an embodiment of the present invention is not particularly limited, and can be, for example, 100 m²/kg or less, 80 m²/kg or less, or 70 m²/kg or less.

A surface-crosslinked water-absorbing agent in accordance with an embodiment of the present invention is such that, although the α-hydroxycarboxylic acid (salt) may not be added in a case where an amount of the aminocarboxylic acid-based chelating agent and/or the phosphorus-based chelating agent is sufficient within the range defined by Formula (A), basically, an amount of the α-hydroxycarboxylic acid (salt) extracted from the water-absorbing agent is more than 0 mol % (or 0 mmol % or more), preferably 0.03 mol % or more, more preferably 0.06 mol % or more, preferably 0.33 mol % or less, more preferably 0.30 mol % or less, and even more preferably 0.27 mol % or less, relative to an amount of carboxyl group-containing unsaturated monomers contained in the water-absorbing agent. With this configuration, it is possible to achieve, in a more balanced manner, both good physical properties and a decrease in speed of coloration with lapse of time.

The amount of the α-hydroxycarboxylic acid (salt) extracted from the water-absorbing agent can be measured, for example, by extracting the water-absorbing agent with use of 0.9 mass % aqueous sodium chloride solution and quantifying an amount of α-hydroxycarboxylic acid (salt) extracted into the 0.9 mass % aqueous sodium chloride solution. The amount of the α-hydroxycarboxylic acid (salt) extracted from the water-absorbing agent can, more specifically, be measured by a method described in the Examples (described later).

A surface-crosslinked water-absorbing agent in accordance with an embodiment of the present invention is such that, although the aminocarboxylic acid-based chelating agent and/or the phosphorus-based chelating agent may not be added in a case where an amount of the α-hydroxycarboxylic acid (salt) is sufficient within the range defined by Formula (B), basically, an amount of the aminocarboxylic acid-based chelating agent and/or the phosphorus-based chelating agent extracted from the water-absorbing agent is more than 0 mmol % (or 0 mmol % or more), preferably 0.05 mmol % or more, more preferably 0.10 mmol % or more, preferably 10 mmol % or less, more preferably 7.5 mmol % or less, and even more preferably 5.0 mmol % or less, relative to an amount of carboxyl group-containing unsaturated monomers contained in the water-absorbing agent. Increasing the amount of the aminocarboxylic acid-based chelating agent and/or the phosphorus-based chelating agent added does not negatively affect the physical properties and the speed of coloration, but increasing the amount to more than 10 mmol % is not preferable due to an economical disadvantage. With this configuration, it is possible to achieve, in a more balanced manner, both good physical properties and a decrease in speed of coloration with lapse of time.

The amount of the aminocarboxylic acid-based chelating agent and/or the phosphorus-based chelating agent extracted from the water-absorbing agent can be measured, for example, by extracting the water-absorbing agent with use of 0.9 mass % aqueous sodium chloride solution and quantifying an amount of the aminocarboxylic acid-based chelating agent and/or the phosphorus-based chelating agent extracted into the 0.9 mass % aqueous sodium chloride solution. The amount of the aminocarboxylic acid-based chelating agent and/or the phosphorus-based chelating agent extracted from the water-absorbing agent can, more specifically, be measured by a method described in the Examples (described later). In order to reduce a product cost, it is preferable that achieving both good physical properties and a decrease in speed of coloration with lapse of time in a more balanced manner be possible even in a case where the amount of the α-hydroxycarboxylic acid (salt) extracted is small. In the present embodiment, in a case where the amount of the aminocarboxylic acid-based chelating agent and/or the phosphorus-based chelating agent extracted is 0.40 mmol % or more and 1.20 mmol % or less and the amount of the α-hydroxycarboxylic acid (salt) extracted is 0.06 mol % or more and 0.15 mol % or less, it is possible to not only achieve, in a more balanced manner, both good physical properties and a decrease in speed of coloration with lapse of time but also reduce a product cost.

In a surface-crosslinked water-absorbing agent in accordance with an embodiment of the present invention, an amount of change between a WI value before coloration with lapse of time (coloration test) and a WI value after the coloration with lapse of time (coloration test) is preferably 40 or less, more preferably 39.5 or less, and even more preferably 39 or less. In a case where the amount of change is within the above range, the surface-crosslinked water-absorbing agent in accordance with an embodiment of the present invention is practical regardless of differences in numerical value. The WI value of the surface-crosslinked water-absorbing agent in accordance with an embodiment of the present invention before the coloration test below is preferably 42 or more, more preferably 46 or more, and even more preferably 50 or more. Note that the coloration test is a test in which the water-absorbing agent is exposed for 7 days in an environment where a temperature is 70±1° C. and a relative humidity is 75±1 RH %, more specifically, a test described in Examples (described later). With this configuration, it is possible to achieve, in a more balanced manner, both good physical properties and a decrease in speed of coloration with lapse of time. Note that the amount of change in WI is expressed by the following formula:

$$\Delta WI(\text{amount of change})=|WI(\text{after coloration test})-WI(\text{before the coloration test})| \quad \text{(Formula)}.$$

It is preferable that a surface-crosslinked water-absorbing agent in accordance with an embodiment of the present invention satisfy a relational formula of Formula (3) below and/or a relational formula of Formula (4) below. It is preferable that a surface-crosslinked water-absorbing agent in accordance with an embodiment of the present invention satisfy the relational formulae of Formulae (3) and (4) below. With this configuration, it is possible to achieve, in a more balanced manner, both good physical properties and a decrease in speed of coloration with lapse of time.

$$y_2 \geq 0.24 x_2 + 18 \quad (3)$$

$$z_2 \geq -10 x_2 + 306 \quad (4)$$

In Formulae (3) and (4), $x_2$ represents CRC, $y_2$ represents AAP, $z_2$ represents SFC, and $x_2$ is a value of preferably 26 or more, more preferably 26.5 or more, even more preferably 27.0 or more, preferably 32.0 or less, more preferably 31.0 or less, and even more preferably 30.5 or less. Note that $y_2$, while satisfying Formula (B), is preferably 24.5 or more, more preferably 25.0 or more, even more preferably 25.5, and most preferably 26.0 or more. An upper limit value of $y_2$ is not particularly limited, but is generally 30 or less $z_2$, while satisfying Formula (3), is 0 or more, preferably 10 or more, more preferably 15 or more, and even more preferably 20 or more. An upper limit value of $z_2$ is not particularly limited, but is generally 80 or less in a case where $x_2$ is within the above range.

The following description will discuss an example of a method for producing the water-absorbing agent.

[3] Method for Producing Water-Absorbing Agent

[3-1] Step of Preparing Aqueous Monomer Solution

This step is a step of preparing an aqueous monomer solution containing: a monomer containing acrylic acid (salt) as a main component; and at least one polymerizable internal crosslinking agent. It is also possible to use a monomer slurry liquid. For convenience, however, the present specification will describe an aqueous monomer solution.

(Monomer)

Examples of the monomer used in the present invention include: anionic unsaturated monomers and salts thereof such as acrylic acid, (anhydrous) maleic acid, itaconic acid, cinnamic acid, vinyl sulfonic acid, allyltoluene sulfonic acid, vinyltoluene sulfonic acid, styrene sulfonic acid, 2-(meth)acrylamide-2-methylpropane sulfonic acid, 2-(meth)acryloyl ethane sulfonic acid, 2-(meth)acryloyl propane sulfonic acid, and 2-hydroxyethyl(meth)acryloyl phosphate; mercaptan group-containing unsaturated monomers; phenolic hydroxide group-containing unsaturated monomers; amide group-containing unsaturated monomers such as (meth)acrylamide, N-ethyl(meth)acrylamide, and N,N-dimethyl(meth)acrylamide; amino group-containing unsaturated monomers such as N, N-dimethylaminoethyl(meth) acrylate, N,N-dimethylaminopropyl(meth)acrylate, and N,N-dimethylaminopropyl(meth)acrylamide; and other monomers. Examples of the monomer include a water-soluble unsaturated monomer and a hydrophobic unsaturated monomer. Of these monomers, acrylic acid (salt) is preferable. Further, acrylic acid (salt) and other monomer(s) may be used in combination. In this case, the amount of acrylic acid (salt) used is preferably 50 mol % or more, more preferably 70 mol % or more, even more preferably 90 mol % or more, and particularly preferably substantially 100 mol %, relative to a total amount of monomers excluding a crosslinking agent.

(Neutralization with Basic Compound)

In a case where an acrylic acid (salt)-based monomer is to be used in an embodiment of the present invention, it is preferable that acrylic acid be partially neutralized with use of a basic compound. In other words, a water-absorbing agent in which acid groups of polyacrylic acid are partially neutralized is preferable in an embodiment of the present invention.

Examples of the basic compound include a carbonate or bicarbonate of an alkali metal, a hydroxide of an alkali metal, ammonia, and organic amine. Out of such examples, from the viewpoint of water absorption performance of the water-absorbing agent, a strongly basic compound is selected. As such, the basic compound is preferably a hydroxide of an alkali metal such as sodium, potassium, or lithium. The basic compound is more preferably sodium hydroxide. From the viewpoint of handleability, the basic compound is preferably in the form of an aqueous solution. Note that commercially available sodium hydroxide contains a heavy metal such as zinc, lead, and/or iron on the order of ppm (mass standard), and may thus be technically referred to as a "composition". In an embodiment of the present invention, such compositions are encompassed in the scope of "basic compounds".

A timing of the above-described neutralization is not limited. The neutralization can be carried out before, during, or after polymerization. The neutralization may be carried out at a plurality of timings or a plurality of number of times. From the viewpoint of efficiency of producing the water-absorbing agent, continuous type neutralization is preferable.

In a case where acrylic acid (salt) is to be used in an embodiment of the present invention, the neutralization rate of the acrylic acid (salt) is preferably 10 mol % or more, more preferably 40 mol % or more, even more preferably 50 mol % or more, particularly preferably 60 mol % or more, preferably 90 mol % or less, more preferably 85 mol % or less, even more preferably 80 mol % or less, and particularly preferably 75 mol % or less, relative to the acid groups of the monomer. Setting the neutralization rate to be within the above range makes it possible to prevent a decrease in the water absorption performance of the water-absorbing agent. The above neutralization rate is applied to neutralization carried out before the polymerization, neutralization carried out during the polymerization, and neutralization carried out after the polymerization. The above neutralization rate is applied similarly to a water-absorbing agent.

(Internal Crosslinking Agent)

In a preferable production method in an embodiment of the present invention, an internal crosslinking agent is used. Examples of the internal crosslinking agent include N,N'-methylenebis(meth)acrylamide, (poly)ethylene glycol di(meth)acrylate, (poly)propylene glycol di(meth)acrylate, trimethylolpropane di(meth)acrylate, trimethylolpropane tri (meth)acrylate, glycerin tri(meth)acrylate, glycerin acrylate methacrylate, ethyleneoxide modified trimethylol propane tri(meth)acrylate, pentaerythritol tetra(meth)acrylate, dipentaerythritol hexa(meth)acrylate, triallyl cyanurate, triallyl isocyanurate, triallyl phosphate, triallylamine, poly(meth) allyloxy alkane, (poly)ethylene glycol diglycidyl ether, glycerol diglycidyl ether, ethylene glycol, polyethylene glycol, propylene glycol, glycerin, pentaerythritol, ethylenediamine, polyethyleneimine, and glycidyl (meth)acrylate. At least one internal crosslinking agent is selected from among these internal crosslinking agents, with consideration given to reactivity and the like.

In an embodiment of the present invention, from the viewpoint of water absorption performance and the like of the water-absorbing agent, the internal crosslinking agent is preferably an internal crosslinking agent having two or more polymerizable unsaturated groups, and more preferably an internal crosslinking agent having a (poly)alkylene glycol structure and two or more polymerizable unsaturated groups. Specific examples of the polymerizable unsaturated groups include an allyl group and a (meth)acrylate group. Out of these examples, a (meth)acrylate group is preferable. Further, the internal crosslinking agent having a (poly) alkylene glycol structure and two or more polymerizable unsaturated groups includes polyethyleneglycol di(meth) acrylate. Note that the number (hereinafter expressed as "n") of alkylene glycol units is preferably 1 or more, more preferably 2 or more, even more preferably 4 or more, particularly preferably 6 or more, preferably 100 or less, more preferably 50 or less, even more preferably 20 or less, and particularly preferably 10 or less.

The amount of the internal crosslinking agent used is preferably 0.0001 mol % or more, more preferably 0.001 mol % or more, even more preferably 0.01 mol % or more, preferably 10 mol % or less, more preferably 5 mol % or less, and even more preferably 1 mol % or less, relative to the monomers excluding the internal crosslinking agent. Setting the amount of the internal crosslinking agent used to be within the above ranges makes it possible to obtain a water-absorbing agent having a desired water absorption performance. The amount of the internal crosslinking agent used falling outside the above ranges may cause a reduction in gel strength accompanied by an increase in water-soluble component and a reduction in absorption capacity.

In an embodiment of the present invention, a timing at which the internal crosslinking agent is added only needs to be a timing that allows a polymer to be uniformly crosslinked, and a method of adding the internal crosslinking agent to an aqueous monomer solution before polymerization and to a hydrogel during or after polymerization is taken as an example. Particularly, a method of adding a predetermined amount of internal crosslinking agent to an aqueous monomer solution in advance is preferable.

(Substance(s) Added to Aqueous Monomer Solution)

In an embodiment of the present invention, from the viewpoint of improving physical properties of the water-absorbing agent, any of the below substances can be added to the aqueous monomer solution at at least one of the following times: during preparation of the aqueous monomer solution; during the polymerization reaction; during the crosslinking reaction; after the polymerization reaction; and after the crosslinking reaction.

Specific examples of the substance which can be added include: a hydrophilic polymer such as α-hydroxycarboxylic acid (salt), starch, a starch derivative, cellulose, a cellulose derivative, polyvinyl alcohol (PVA), polyacrylic acid (salt), and crosslinked polyacrylic acid (salt); and a compound such as a carbonate, an azo compound, a foaming agent which generates any of various types of gas bubbles, a surfactant, an aminocarboxylic acid-based chelating agent and/or a phosphorus-based chelating agent, and a chain transfer agent.

Examples of the above α-hydroxycarboxylic acid (salt) compound include malic acid (salt), lactic acid (salt), glycolic acid (salt), tartaric acid (salt), citric acid-(salt), and mandelic acid (salt).

Although the α-hydroxycarboxylic acid (salt) compound may not be added in a case where an amount of the aminocarboxylic acid-based chelating agent and/or the phosphorus-based chelating agent is sufficient, basically, an amount of the α-hydroxycarboxylic acid (salt) compound added is preferably 0.41 mol % or less, more preferably 0.37 mol % or less, even more preferably 0.33 mol % or less, can be 0 mmol %, and is preferably more than 0 mol %, more preferably 0.04 mol % or more, even more preferably 0.06 mol % or more, and particularly preferably 0.08 mol % or more, relative to an amount of carboxyl group-containing unsaturated monomers contained in the water-absorbing agent. An amount of the α-hydroxycarboxylic acid (salt) compound added exceeding the above range is not preferable due to causing deterioration of water absorbent properties (in particular, AAP and SFC) of the water-absorbing agent and thus resulting in a poor balance between an effect of reducing coloration with lapse of time and absorption properties.

More specific examples of the aminocarboxylic acid-based chelating agent include chelating agents disclosed in, for example, Japanese Patent Application Publication Tokukaihei No. 11-060975, the pamphlet of International Publication No. WO 2007/004529, the pamphlet of International Publication No. WO 2011/126079, the pamphlet of International Publication No. WO 2012/023433, Published Japanese Translation of PCT International Application Tokuhyo No. 2009-509722, Japanese Patent Application Publication Tokukai No. 2005-097519, Japanese Patent Application Publication Tokukai No. 2011-074401, Japanese Patent Application Publication Tokukai No. 2013-076073, Japanese Patent Application Publication Tokukai No. 2013-213083, Japanese Patent Application Publication Tokukaisho No. 59-105448, Japanese Patent Application Publication Tokukaisho No. 60-158861, Japanese Patent Application Publication Tokukaihei No. 11-241030, and Japanese Patent Application Publication Tokukaihei No. 2-41155.

The phosphorus-based chelating agent used in an embodiment of the present invention is preferably an organic aminophosphoric acid having an amino group, and can be a water-soluble organic aminophosphoric acid, or further, a water-soluble non-polymeric organic aminophosphoric acid. The number of amino groups per molecule of the organic aminophosphoric acid is preferably one or more, and even more preferably two or more. The number of phosphate groups per molecule of the organic aminophosphoric acid is preferably one or more, even more preferably two or more, and particularly preferably three or more. An upper limit of the number of the amino groups and an upper limit of the number of the phosphate groups are each ordinarily 100 or less, even more preferably 10 or less, and particularly preferably 5 or less. In the present invention, "water-soluble" means that a compound dissolves in 100 g of water at 25° C. in an amount of 0.1 g or more, even more preferably 1 g or more, and particularly preferably 5 g or more. A molecular weight is in a range of ordinarily 50 to 5000, preferably 100 to 1000, and even more preferably 200 to 500.

Examples of the phosphorus-based chelating agent used include ethylenediamine-N,N'-di(methylene phosphinic acid), ethylenediaminetetra(methylene phosphinic acid), nitriloacetic acid-di(methylene phosphinic acid), nitrilodiacetic acid-(methylene phosphinic acid), nitriloacetic acid-s-proprionic acid-methylene phosphonate, nitrilotris(methylene phosphonate), cyclohexanediaminetetra(methylene phosphonate), ethylenediamine-N,N'-diacetic acid-N,N'-di(methylene phosphonate), ethylenediamine-N,N'-di(methylene phosphonate), ethylenediaminetetra(methylene phosphonate), polymethylenediaminetetra(methylene phosphonate), diethylenetriaminepenta(methylene phosphonate), 1-hydroxyethylidenediphosphonic acid, and a salt of any of the above. The most preferable phosphorus-based chelating agent in the present invention is ethylenediaminetetra(methylene phosphonate) or a salt thereof. Examples of a preferable salt include alkali metal salts such as sodium salt and potassium salt, ammonium salts, and amine salts. The salt is particularly preferably sodium salt or potassium salt.

Although the aminocarboxylic acid-based chelating agent and/or the phosphorus-based chelating agent may not be added in a case where an amount of the α-hydroxycarboxylic acid (salt) is sufficient, basically, an amount of the aminocarboxylic acid-based chelating agent and/or the phosphorus-based chelating agent added is preferably 20 mmol % or less, more preferably 18 mmol % or less, even more preferably 16 mmol % or less, particularly preferably 14 mmol %, can be 0 mmol %, and is preferably more than 0 mmol %, more preferably 0.4 mmol % or more, and even more preferably 0.8 mmol % or more, relative to an amount of carboxyl group-containing unsaturated monomers contained in the water-absorbing agent. An amount of the aminocarboxylic acid-based chelating agent and/or the phosphorus-based chelating agent added exceeding the above range is not preferable due to an economical disadvantage and also due to deterioration of a color tone of the water-absorbing agent by a color derived from the chelating agent(s) used.

The α-hydroxycarboxylic acid (salt), and the aminocarboxylic acid-based chelating agent and/or the phosphorus-based chelating agent can be added in any of the steps described later. However, in a case where these additives are distributed not uniformly but nonuniformly in the water-absorbing agent, a particle that undergoes coloration with lapse of time and a particle that does not undergo coloration with lapse of time coexist. This will likely result in variations in the effect of reducing coloration depending on a part collected during a production process of an absorbent body or an absorbent article or depending on a production lot. As such, a step of adding the α-hydroxycarboxylic acid (salt), and the aminocarboxylic acid-based chelating agent and/or the phosphorus-based chelating agent is carried out preferably in or before a surface-crosslinking step, more preferably in or before a gel-crushing step, even more preferably in or before a polymerization step, and most preferably in a step of adjusting an aqueous monomer solution. A water-absorbing agent that is added internally (for example, added in or before the polymerization step) has higher performance and can provide more stable physical properties than a water-absorbing agent that is added later (for example, added after the surface-crosslinking agent step).

(Monomer Component Concentration)

The aqueous monomer solution is prepared by selecting various substances and various components (hereinafter referred to as a "monomer component") as described above in accordance with an objective and then mixing the selected substances and components together in respective amounts defined so as to fall within the above-described ranges. Note that, in an embodiment of the present invention, instead of employing an aqueous monomer solution, it is possible to employ a mixed monomer solution containing water and a hydrophilic solvent.

Further, from the viewpoint of the physical properties of the water-absorbing agent, the concentration of the total of the monomer component is preferably 10 mass % or more, more preferably 20 mass % or more, even more preferably 3.0 mass % or more, preferably 80 mass % or less, more preferably 75 mass % or less, and even more preferably 70 mass % or less. The concentration of the monomer component is calculated by use of the following Formula (A):

Monomer component concentration(mass %)=[(mass of monomer component)/(mass of aqueous monomer solution)]×100   Formula (A).

Note that in Formula (A), the "mass of the aqueous monomer solution" does not include a mass of a graft component, a mass of the water-absorbing agent, or a mass of a hydrophobic organic solvent used in reversed phase suspension polymerization.

[3-2] Polymerization Step

This step is a step of polymerizing an aqueous monomer solution so that a crosslinked hydrogel polymer (hereinafter simply referred to as "hydrogel") is obtained. Preferably, this step is a step of polymerizing the aqueous monomer solution obtained in the step of preparing the aqueous monomer solution so that a hydrogel is obtained, the aqueous monomer solution containing a carboxyl group-containing unsaturated monomer and at least one polymerizable internal crosslinking agent, the carboxyl group-containing unsaturated monomer containing acrylic acid (salt) as a main component.

(Polymerization Initiator)

As a polymerization initiator used in an embodiment of the present invention, one (or two or more) of the polymerization initiators used in an ordinary water-absorbing agent production can be selected and used in accordance with, for example, the type of monomer to be polymerized and polymerization conditions. Examples of the polymerization initiator include a pyrolysis-type initiator and a photolytic-type initiator.

Examples of the pyrolysis-type initiator include persulfates such as sodium persulfate, potassium persulfate, and ammonium persulfate; peroxides such as hydrogen peroxide, t-butyl peroxide, and methyl ethyl ketone peroxide; and azo compounds such as an azonitrile compound, an azoamidine compound, a cyclic azoamidine compound, an azoamide compound, an alkylazo compound, 2,2'-azobis(2-amidinopropane) dihydrochloride, and 2,2'-azobis[2-(2-imidazolin-2-yl) propane]dihydrochloride.

Examples of the photolytic-type initiator include benzoin derivatives, benzyl derivatives, acetophenone derivatives, benzophenone derivatives, and azo compounds.

Of these polymerization initiators, persulfates are preferable, in consideration of cost and an ability to reduce a residual monomer. Alternatively, an oxidizing polymerization initiator which is, for example, any of the above-listed persulfates or any of the above-listed peroxides and a reducing agent (for facilitating decomposition of the oxidizing polymerization initiator) can be used in combination to allow the combination to serve as a redox-type initiator. Examples of the reducing agent include a (bi)sulfurous acid (salt) such as sodium sulfite and sodium hydrogen sulfite, a reducing metal (salt) such as L-ascorbic acid (salt) and ferrous salt, and an amine.

The amount of the polymerization initiator used is preferably 0.001 mol % or more, more preferably 0.01 mol % or more, preferably 1 mol % or less, more preferably 0.5 mol % or less, and even more preferably 0.1 mol % or less, relative to the monomers excluding the internal crosslinking agent. Further, the amount of the reducing agent used is preferably 0.0001 mol % or more, more preferably 0.0005 mol % or more, preferably 0.02 mol % or less, and more preferably 0.015 mol % or less, relative to the monomers excluding the internal crosslinking agent. Setting the amounts of polymerization initiator and reducing agent used to be within the above ranges makes it possible to obtain a water-absorbing agent having a desired water absorption performance.

In an embodiment of the present invention, the polymerization reaction may be initiated by irradiation of an active energy ray such as a radiation ray, an electron ray, and/or an ultraviolet ray. It is also possible to combine irradiation of an active energy ray with the above-described polymerization initiator.

(g) Polymerization Inhibitor

When the polymerization is carried out, a polymerization inhibitor is preferably contained. Examples of the polymerization inhibitor include N-oxyxyl compounds, manganese compounds, and substituted phenol compounds, each of which is disclosed in International Publication No. WO 2008/096713. Of these polymerization inhibitors, substituted phenols are preferable, and methoxyphenols are particularly preferable.

Specific examples of a methoxyphenol that can be preferably used include o-, m-, p-methoxyphenol, and a methoxyphenol that has one or more substituents such as a methyl group, a t-butyl group, and a hydroxyl group. A methoxyphenol that can be particularly preferably used in an embodiment of the present invention is p-methoxyphenol. Although a content of a methoxyphenol only has to be 5 ppm to 200 ppm, the content is preferably 5 ppm to 160 ppm, more preferably 10 ppm to 160 ppm, more preferably 10 ppm to 100 ppm, even more preferably 10 ppm to 80 ppm, and most preferably 10 ppm to 70 ppm.

In a case where a content of p-methoxyphenol is more than 200 ppm, the resultant water-absorbing resin has the problem of coloration (yellowing). Further, it is not preferable that the content of p-methoxyphenol be less than 10 ppm, in particular, less than 5 ppm, because in such a case, i.e., in a case where p-methoxyphenol, which is a polymerization inhibitor, is removed by purification such as distillation, not only is there a risk of occurrence of polymerization before the polymerization is intentionally started, but also, surprisingly, the polymerization speed may even decrease. Further, it is not preferable that the content of p-methoxyphenol be even less, because in such a case where, a swollen gel of the resultant water-absorbing resin has poor light resistance. In general, a swollen gel of a water-absorbing resin is degraded by light. It has been found that use of p-methoxyphenol improves light resistance.

(h) Fe Content and Other Impurities

A monomer in an embodiment of the present application preferably contains iron, or contains no iron. An iron content (Fe) is 2 ppm or less, preferably 1.5 ppm or less, more preferably 1.0 pm or less, even more preferably 0.5 ppm or less, and particularly preferably 0.3 ppm or less, relative to the monomers. A high iron content decreases a polymerization rate and thus increases residual monomers. This causes not only the problem of odor but also the problem of coloration and degradation of the resultant water-absorbing resin. Thus, a high iron content is not preferable. Note that iron is contained mainly as a trace component in a base used for neutralization, in particular, caustic soda or sodium (hydrogen) carbonate. As such, controlling a purity of caustic soda or the like makes it possible to control the iron content. From the perspective of a cost of purifying the base (in particular, caustic soda), 0.001 ppm, or even 0.01 ppm, is sufficient as a lower limit of the iron content (Fe).

For example, in a case where 5 ppm of Fe is contained in NaOH, 75 mol % neutralized sodium acrylate has an iron content (Fe) of 5 ppm×(40×0.75/88.5)=1.7 ppm, according to "acrylic acid (molecular weight: 72)+NaOH (molecular weight: 40)×0.75=75 mol % neutralized sodium acrylate (molecular weight: 88.5)". Note that an iron content in the base or in the water-absorbing resin can be quantified, for example, by ICP emission spectrometry described in JIS K1200-6, and International Publication No. WO 2008/090961 can be referred to as a reference for a quantification method.

Among six impurities in the acrylic acid, namely, protoanemonin, allyl acrylate, allyl alcohol, aldehyde part (in particular, furfural), maleic acid, and benzoic acid, one or more, two or more, three or more, four or more, five or more, or all six are each contained in an amount of 0 ppm to 20 ppm. An amount of each of the impurities is 0 ppm to 10 ppm, more preferably 0 ppm to 5 ppm, even more preferably 0 ppm to 3 ppm, particularly preferably 0 ppm to 1 ppm, and most preferably ND (detection limit). A total amount of protoanemonin, allyl acrylate, allyl alcohol, aldehyde part, maleic acid, and benzoic acid (relative to a weight of the acrylic acid) is preferably 100 ppm or less, more preferably 0 ppm to 20 ppm, and even more preferably 0 ppm to 10 ppm. As a suitable method for controlling amounts of these trace components and propionic acid, the following acrylic acid not derived from fossil fuel is used.

Having a large amount of the above impurities increases residual monomers and soluble components of the water-absorbing resin and/or causes coloration. Similarly, a water content of the acrylic acid is preferably 20 weight % or less, more preferably 1 weight % or less, even more preferably 0.5 weight % or less, and particularly preferably 0.2 weight % or less, from the viewpoint of residual monomers. That is, for preparation of monomers, acrylic acid (water content: 0.2 weight % or less) is more preferable than an aqueous acrylic acid solution (for example, a commercially available 80 weight % aqueous solution).

(Form of Polymerization)

Examples of forms of polymerization which can be applied to an embodiment of the present invention include aqueous solution polymerization, reversed phase suspension polymerization, spray polymerization, droplet polymerization, bulk polymerization, and precipitation polymerization. Out of these forms, from the viewpoints of ease of controlling polymerization and the water absorption performance of the water-absorbing agent, the form of polymerization is preferably aqueous solution polymerization or reversed phase suspension polymerization, more preferably aqueous solution polymerization, and even more preferably continuous aqueous solution polymerization. Examples of the reversed phase suspension polymerization are disclosed in, for example, International Publication No. WO 2007/004529 and International Publication No. WO 2012/023433. The continuous aqueous solution polymerization makes it possible to produce the water-absorbing agent with high productivity. Examples of the continuous aqueous solution polymerization include: continuous belt polymerization as disclosed in, for example, U.S. Pat. Nos. 4,893,999, 6,906, 159, 7,091,253, 7,741,400, 8,519,212, and Japanese Patent Application Publication Tokukai No. 2005-36100; and continuous kneader polymerization as disclosed in, for example, U.S. Pat. No. 6,987,151.

Examples of preferable forms of the continuous aqueous solution polymerization include high-temperature-initiating polymerization, high-concentration polymerization, and foaming polymerization. The "high-temperature-initiating polymerization" means a form of polymerization in which a temperature of the aqueous monomer solution at the initiation of polymerization is preferably 35° C. or more, more preferably 40° C. or more, even more preferably 45° C. or more, particularly preferably 50° C. or more, and preferably a temperature that is equal to or lower than a boiling point of the aqueous monomer solution. Further, the "high-concentration polymerization" means a form of polymerization in which a monomer concentration at the initiation of polymerization is preferably 30 mass % or more, more preferably 35 mass % or more, even more preferably 40 mass % or more, particularly preferably 45 mass % or more, and preferably a concentration that is equal to or lower than a saturation concentration of the aqueous monomer solution. The "foaming polymerization" means a form of polymerization in which the aqueous monomer solution to be polymerized contains a foaming agent or gas bubbles. One of these forms of polymerization may be employed alone. Alternatively, two or more of these forms of polymerization may be employed in combination.

Examples of a method for dispersing gas bubbles in the foaming polymerization include: a method of dispersing gas bubbles by reducing the solubility of gas dissolved in the aqueous monomer solution; a method of introducing gas from an external source and dispersing the gas as gas bubbles; and a method of causing foaming by adding a foaming agent to the aqueous monomer solution. A combination of any of these methods for dispersing gas bubbles may be employed as appropriate in accordance with desired physical properties of the water-absorbing agent.

With regards to a case where a gas is introduced from the external source, examples of the gas include oxygen, air, nitrogen, carbonic acid gas, ozone, and the like, as well as a mixed gas constituted by a mixture of any of these gases. From the viewpoints of polymerizability and cost, preferably used is an inert gas(es) such as nitrogen and carbonic acid; gas, and more preferably used is nitrogen.

Examples of the foaming agent that can be used include an azo compound and a solution of an organic or inorganic carbonate, dispersion liquid thereof, or powder thereof having particle diameter of 0.1 μm to 1000 μm. Out of these examples, the inorganic carbonate is preferable. Specific examples include a carbonate such as sodium carbonate, ammonium carbonate, and magnesium carbonate, and a bicarbonate.

Subjecting a foam-shaped hydrogel obtained by the foaming polymerization to gel-crushing facilitates drying. Further, a foam-shaped water-absorbing agent makes it possible to improve the water absorption speed of the water-absorbing agent. That the water-absorbing agent is a foam-shaped water-absorbing agent means that, when observed by use of an electron microscope, the water-absorbing agent has pores and cavities on a surface of a particle of the water-absorbing agent, each of the cavities being a shape of a crater that would be obtained by removing a part of a sphere. Whether or not the water-absorbing agent has the pores and the cavities can be confirmed by observing the pores (for example, pores having a diameter of 1 μm to 100 μm). The number of the pores and the number of the cavities are each preferably one or more, more preferably three or more, particularly preferably 10 or more, preferably 10000 or less, more preferably 1000 or less, and particularly preferably 100 or less, per particle of the water-absorbing agent. The number of such particles is preferably five or more, more preferably 10 or more, and more preferably 20 or more, in a case where 100 particles classified as falling in a range of, for example, 600 μm to 300 μm are observed. These are achieved by control via the foaming polymerization.

[3-3] Gel-Crushing Step

This step is a step of crushing a hydrogel during and/or after the polymerization step. Specifically, the hydrogel may be crushed in the polymerization step, and alternatively, the hydrogel may be crushed after the polymerization step. In other words, this step is a step of gel-crushing the hydrogel so that a hydrogel in the form of particles (hereinafter referred to as "particulate hydrogel") is obtained. This step is called "gel-crushing" to distinguish it from the "pulverization" of the later-described pulverizing step.

The gel-crushing refers to adjusting the size of the hydrogel so as to be a predetermined size, with use of a kneader, a screw extruder such as a meat chopper, or a gel-crusher such as a cutter mill.

In a case where the hydrogel is to be gel-crushed, it is preferable that preferably hot water be added to a gel crusher. The addition of hot water is preferably carried out since a resulting particulate hydrogel has low tackiness and good air permeability and is thus easy to dry. The hot water has a temperature of preferably 40° C. or more, more preferably 50° C. or more, even more preferably 60° C. or more, and preferably 100° C. or less.

With regards to, for example, the form of the gel-crushing and the operating conditions employed in the gel-crushing, the disclosures of the pamphlet of International Publication No. 2011/126079 can be preferably applied to an embodiment of the present invention. Note that in a case where the form of polymerization is kneader polymerization, the polymerization step and the gel-crushing step are carried out simultaneously. Undergoing the gel-crushing step in an embodiment of the present invention makes it possible to obtain a water-absorbing agent having a non-uniformly pulverized shape.

The particulate hydrogel grain-refined through the gel-crushing step has a particle diameter in a range of preferably 0.1 mm to 10 mm, from the viewpoints of ease of drying and physical properties of a resulting water-absorbing agent. Further, the particulate hydrogel has a mass average particle diameter (D50) of preferably 0.1 mm or more, preferably 5 mm or less, more preferably 2 mm or less. A particulate hydrogel having a mass average particle diameter (D50) falling outside the above ranges may be insufficiently dried. In an embodiment of the present invention, a hydrogel to be subjected to the drying step preferably has a mass average particle diameter falling within any of the above ranges, and more preferably satisfies both the above-described particle diameter and the above-described mass average particle diameter.

Note that, in order to increase the specific surface area of a water-absorbing agent, the gel-crushing method disclosed in the pamphlet of International Publication No. WO 2011/126079 is preferably used. Further, the gel-crushing method may be used in combination with the above-described foaming polymerization.

Further, to perform drying uniformly and efficiently, the particulate hydrogel has a moisture content of preferably 30 mass % or more, more preferably 45 mass % or more, preferably 70 mass % or less, and more preferably 55 mass % or less.

[3-4] Drying Step

This step is a step of drying a crushed hydrogel. Specifically, this step is a step of drying the particulate hydrogel until a desired solid content is attained, so that a dried polymer is obtained. The solid content, i.e. a value obtained by subtracting a moisture content from 100 mass % of the gel, is preferably 80 mass % or more, more preferably 85 mass % or more, even more preferably 90 mass % or more, particularly preferably 92 mass % or more, preferably 99 mass % or less, even more preferably 98 mass % or less, and particularly preferably 97 mass % or less. Setting the solid content of the dried polymer to fall within any of the above ranges makes it possible to efficiently carry out pulverization, classification, and surface-crosslinking. Note that in the present specification, the phrase "drying is completed" means a state in which the solid content reaches 80 mass %. In this step, the dried polymer is in the form of a block, and the moisture content of the dried polymer can vary depending on which portion in the block of the following portions: an upper portion thereof, a lower portion thereof, a central portion thereof, and an end portion thereof the dried polymer is located in. In this case, dried polymers are obtained appropriately from various positions of the block and crushed if necessary, and after that, moisture contents of the dried polymers are measured and averaged.

In the present specification, a dried polymer with a solid content falling below the predetermined solid content can be referred to as an undried material. There may be a case where a "material to be dried" in the drying step includes a particulate hydrogel.

Examples of a drying method in the drying step include thermal drying, hot air drying, drying under reduced pressure, fluidized bed drying, infrared drying, microwave drying, drying by azeotropic dehydration with a hydrophobic organic solvent, high humidity drying by use of high temperature water vapor, and stirring drying. Of these drying methods, stirring drying and hot air drying are preferable from the viewpoint of drying efficiency. Stirring drying is preferably carried out by use of a stirring dryer such a paddle dryer or a rotatable drum type dryer. Further, hot air drying is preferably carried out by use of a through-flow band-type dryer that carries out hot air drying on a through-flow belt. With use of the through-flow band-type dryer, efficient drying is carried out while preventing, for example, the generation of fine powder due to physical breakage and friction of a dried polymer and a material to be dried of, for example, a particulate hydrogel in the process of being dried.

A drying temperature, i.e. a temperature of hot air, in an embodiment of the present invention is preferably 120° C. or more, more preferably 130° C. or more, even more preferably 150° C. or more, preferably 250° C. or less, more preferably 230° C. or less, and even more preferably 200° C. or less, in consideration of drying efficiency. Further, a drying time is preferably 10 minutes or more, more preferably 20 minutes or more, even more preferably 30 minutes or more, preferably 2 hours or less, more preferably 1.5 hours or less, and even more preferably 1 hour or less. Setting the drying temperature and the drying time to be within these ranges makes it possible to obtain a water-absorbing agent whose physical properties are within a desired range. Note that other drying conditions can be set as appropriate in accordance with a moisture content of a particulate hydrogel to be dried, total mass thereof, and a desired solid content. In the case of band drying, various conditions disclosed in, for example, the pamphlet of International Publication No. WO 2006/100300, the pamphlet of International Publication No. WO 2011/025012, the pamphlet of International Publication No. WO 2011/025013, and the pamphlet of International Publication No. WO 2011/111657 can be applied as necessary.

(Through-Flow Band-Type Dryer)

In a case where the material to be dried is dried by use of the through-flow band-type dryer, the material to be dried is continuously fed so as to form a layer (hereinafter referred to as "gel layer") on a band of the band dryer and is hot-air dried. The band of this dryer has a width of preferably 0.5 m or more, more preferably 1 m or more, preferably 10 m or less, and more preferably 5 m or less. The band has a length of preferably 20 m or more, more preferably 40 m or more, preferably 100 m or less, and more preferably 50 m or less.

A speed of travel of the material to be dried on the band may be set as appropriate depending on, for example, the belt width, belt length, production volume, and drying time, but, from the viewpoint of, for example, a load on a belt drive device and durability of the device, is preferably 0.3 m/min or more, more preferably 0.5 m/min or more, even more preferably 0.7 m/min or more, preferably 5 m/min or less, more preferably 2.5 m/min or less, even more preferably 2 m/min or less, and particularly preferably 1.5 m/min or less.

The gel layer of the material to be dried spread over the through-flow band-type dryer has an average thickness of preferably 3 cm or more, more preferably 5 cm or more, even more preferably 8 cm or more, preferably 30 cm or less, more preferably 20 cm or less, and even more preferably 15 cm or less. To attain the above solid content efficiently under the above conditions, it is desirable that the thickness of the gel layer be set to be within any of the above ranges. A gel layer having an excessively large thickness is more likely to cause a remaining undried material and non-uniform dryness. Thus, even through the predetermined drying step is carried out, a high proportion of a dried polymer that does not satisfy the above-described preferable solid content may be obtained.

In an embodiment of the present invention, a rate of change in thickness caused by the through-flow band-type dryer, as determined by the following formula, is preferably 1.05 or more, more preferably 1.1 or more, preferably 3 or less, more preferably 2.5 or less, and even more preferably 2 or less.

Rate of change in thickness={(maximum thickness of material to be dried in width direction thereof)/(average thickness of material to be dried in width direction thereof)}

In drying the gel layer on the through-flow belt, a thickness of the gel layer on the band preferably varies, rather than being uniform, in the width direction in order to achieve more uniform dryness. The rate of change in thickness of the gel layer is of thicknesses of a cross section taken in a vertical direction with respect to a traveling direction of the band, and is of thicknesses of a polymerized gel in the width direction as measured in a predetermined section in a traveling direction of the through-flow belt. That is, a thickness of the gel layer in an embodiment of the present invention is a thickness before drying is started on the through-flow belt, in other words, a thickness of the material to be dried until a solid content concentration of the material to be dried increases. Note that "until a solid content concentration increases" means a period until a solid content concentration of the material to be dried increases, preferably by 1 mass %, more preferably 0.5 mass %, even more preferably by 0 mass %, with respect to the solid content concentration of the material to be dried before drying. In an embodiment of the present invention, preferably only one of, and more preferably both of the above-described thickness of the gel layer and the above-described rate of change in thickness of the gel layer is/are satisfied.

In an embodiment of the present invention, it is preferable to further carry out a thickness control operation with respect to the material to be dried spread over the through-flow band-type dryer. Carrying out the thickness control operation to thereby satisfy preferably the above-described thickness of the gel layer, more preferably the above-described rate of change in thickness, and even more preferably the thickness of the gel layer and the rate of change in thickness allows insufficient dryness due to coarse agglomerates to be even more prevented. The thickness control operation is not particularly limited, provided that the thickness control operation is capable of adjusting a thickness of the material to be dried on the band. Examples of the thickness control operation include an operation with use of a rake, a rotary-type leveling machine, or the like.

[3-5] Pulverizing Step and Classification Step

A pulverizing step is a step of pulverizing a polymer obtained after drying, and a classification step is a step of removing fine powder from a pulverized polymer. Specifically, this step is a step of pulverizing the dried polymer obtained through the drying step in the pulverizing step and adjusting the particle size of the pulverized polymer to a particle size within a desired range in the classification step so as to obtain a water-absorbing agent. Undergoing the pulverizing step after drying makes it possible to obtain a water-absorbing agent having a non-uniformly pulverized shape (water-absorbing resin particles having a non-uniformly pulverized shape before surface-crosslinking).

Examples of a pulverizer which can be used in the pulverizing step include: a high-speed rotation pulverizer such as a roll mill, a hammer mill, a screw mill, or a pin mill; a vibration mill; a knuckle-type pulverizer; and a cylindrical mixer. Out of these examples, a roll mill is preferable from the viewpoint of efficiency of pulverization. It is also possible to employ a combination of a plurality of these pulverizers.

Examples of methods for adjusting the particle size in the classification step include sieve classification with use of a JIS standard sieve (JIS Z8801-1 (2000)), airflow classification, and the like. Out of these examples, sieve classification is preferable from the viewpoint of classification efficiency. Note that, from the viewpoint of ease of pulverization, the classification step may be additionally carried out before the pulverizing step.

A specific surface area of the water-absorbing agent (a water-absorbing agent before surface-crosslinking, water-absorbing resin particles contained in a water-absorbing agent and having a non-uniformly pulverized shape before surface-crosslinking) having a non-uniformly pulverized shape can be 32 m$^2$/kg or more, 36 m$^2$/kg or more, 40 m$^2$/kg or more, 44 m$^2$/kg or more, 48 m$^2$/kg or more, 52 m$^2$/kg or more, 56 m$^2$/kg or more, or 60 m$^2$/kg or more. An upper limit value of a specific surface area of a surface-crosslinked water-absorbing agent in accordance with an embodiment of the present invention is not particularly limited, and can be, for example, 100 m$^2$/kg or less, 80 m$^2$/kg or less, or 70 m$^2$/kg or less.

The water-absorbing agent (a water-absorbing agent before surface-crosslinking, water-absorbing resin particles contained in a water-absorbing agent and having a non-uniformly pulverized shape before surface-crosslinking) having a non-uniformly pulverized shape has a particle size distribution such that a mass average particle diameter (D50) is preferably 250 μm or more and 600 μm or less, and a proportion of particles having a particle diameter of less than 150 μm is 5 mass % or less. An upper limit of the mass average particle diameter (D50) is preferably 550 μm or less, more preferably 500 μm or less, and even more preferably 450 μm or less. Further, the proportion of the particles having a particle diameter of less than 150 μm is preferably 4 mass % or less, more preferably 3 mass % or less, and even more preferably 2 mass % or less. Further, the proportion of the particles having a particle diameter of more than 710 μm is preferably 3 mass % or less, more preferably 2 mass % or less, and even more preferably 1 mass % or less. Further, a logarithmic standard deviation (σζ) that indicates narrowness of the particle size distribution is preferably 0.20 or more, more preferably 0.25 or more, even more preferably 0.27 or more, preferably 0.50 or less, more preferably 0.45 or less, even more preferably 0.40 or less, and particularly preferably 0.35 or less. A smaller value of the logarithmic standard deviation (σζ) of the particle size distribution correlates to a more uniform particle diameter and offers the advantage of less particle segregation. Preferably, the mass average particle diameter (D50) and the proportion of the particles having a particle diameter of less than 150 μm are satisfied. More preferably, the mass average particle diameter (D50), the proportion of the particles having a particle diameter of less than 150 μm, and the proportion of the particles having a particle diameter of more than 710 μm are satisfied. Even more preferably, the mass average particle diameter (D50), the proportion of the particles having a particle diameter of less than 150 μm, the proportion of the particles having a particle diameter of more than 710 μm, and the logarithmic standard deviation are satisfied. The mass average particle diameter (D50), the proportion of the particles having a particle diameter of less than 150 μm, the proportion of the particles having a particle diameter of more than 710 μm, and the logarithmic standard deviation can be combined as appropriate so as to be within the above-described ranges.

The above-described particle size is also applied to a water-absorbing agent (water-absorbing resin particles contained in a water-absorbing agent and having a non-uniformly pulverized shape after surface-crosslinking) after surface-crosslinking. Therefore, in a case where surface-crosslinking is carried out, it is preferable to subject the water-absorbing agent to surface-crosslinking treatment in the surface-crosslinking step so that the particle size falling within the above-described range which has been adjusted for the water-absorbing agent before surface-crosslinking is maintained, and it is more preferable to carry out particle size adjustment by carrying out a sizing step subsequent to the surface-crosslinking step. Note that it is preferable that a water-absorbing agent which has not passed through a sieve having a mesh size of 710 μm in the classification step be returned to the pulverizing step and pulverized again in the pulverizing step.

[3-6] Surface-Crosslinking Step

This step is a step of providing, on a surface of a water-absorbing agent before surface-crosslinking obtained through the above-described steps, a portion with a higher crosslinking density. The surface-crosslinking step includes, for example, a mixing step, a heat treatment step, and a cooling step. The surface-crosslinking step involves, for example, radical crosslinking on the surface of the water-absorbing agent before surface-crosslinking, surface polymerization on the surface of the water-absorbing agent before surface-crosslinking, and a crosslinking reaction with a surface-crosslinking agent on the surface of the water-absorbing agent before surface-crosslinking, so as to obtain a surface-crosslinked water-absorbing agent (surface-crosslinked water-absorbing resin particles contained in a water-absorbing agent and having a non-uniformly pulverized shape).

[3-6-1] Mixing Step

This step is a step of mixing, in a mixing apparatus, a solution containing a surface-crosslinking agent (hereinafter referred to as a "surface-crosslinking agent solution") with the water-absorbing agent before surface-crosslinking, so that a humidified mixture is obtained.

(Surface-Crosslinking Agent)

In an embodiment of the present invention, a surface-crosslinking agent is used at the time of surface-crosslinking. Examples of the surface-crosslinking agent include the surface-crosslinking agents disclosed in U.S. Pat. No. 7,183,456. At least one surface-crosslinking agent is selected from among these surface-crosslinking agents, with consideration given to reactivity and the like. Furthermore, from the viewpoints of, for example, handleability of the surface-crosslinking agent and water absorption performance of the water-absorbing agent, preferably selected is a surface-crosslinking agent which: has two or more functional groups which react with a carboxyl group; and is an organic compound which forms covalent bonds.

Specific examples of the surface-crosslinking agent include: polyhydric alcohol compounds such as ethylene glycol, diethylene glycol, triethylene glycol, tetraethylene glycol, polyethylene glycol, propylene glycol, dipropylene glycol, polypropylene glycol, 1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, 2,3-pentanediol, 2,4-pentanediol, 1,2-hexanediol, 1,3-hexanediol, 1,4-hexanediol, 1,5-hexanediol, 1,6-hexanediol, 2,3-hexanediol, 2,4-hexanediol, glycerin, polyglycerin, diethanolamine, and triethanolamine; polyhydric amine compounds such as ethylenediamine, diethylenetriamine, triethylenetetramine, tetraethylenepentamine, pentaethylenehexamine, polyallylamine, and polyethylene imine; haloepoxy compounds; a condensate of any of the polyhydric amine compounds and any of the haloepoxy compounds; oxazoline compounds such as 1,2-ethylene bisoxazoline; oxazolidinone compounds; alkylene carbonate compounds such as 1,3-dioxolane-2-one (ethylene carbonate), 4-methyl-1,3-dioxolane-2-one, 4,5-dimethyl-1,3-dioxolane-2-one, 4,4-dimethyl-1,3-dioxolane-2-one, 4-ethyl-1,3-dioxolane-2-one, 4-hydroxymethyl-1,3-dioxolane-2-one, 1,3-dioxane-2-one, 4-methyl-1,3-dioxane-2-one, 4,6- dimethyl-1,3-dioxane-2-one, and 1,3-dioxopane-2-one; polyvalent glycidyl compounds such as ethylene glycol diglycidyl ether, polyethylene diglycidyl ether, propylene glycol diglycidyl ether, polypropylene glycol diglycidyl ether, glycerol polyglycidyl ether, diglycerol polyglycidyl ether, polyglycerol polyglycidyl ether, and glycidol; oxetane compounds; vinyl ether compounds; and cyclic urea compounds.

An amount of the surface-crosslinking agent used or a total amount in a case where more than one surface-crosslinking agent is used is preferably 0.01 parts by mass or more, preferably 10 parts by mass or less, more preferably 5 parts by mass or less, and even more preferably 2 parts by mass or less, relative to 100 parts by mass of the water-absorbing agent before surface-crosslinking. Setting the amount of surface-crosslinking agent used to be within any of the above ranges makes it possible to form an optimal crosslinked structure in the surface layer of the water-absorbing agent before surface-crosslinking and thus makes it possible to obtain a water-absorbing agent with excellent physical properties.

The surface-crosslinking agent is preferably added in the form of an aqueous solution to the water-absorbing agent before surface-crosslinking. In such a case, an amount of water used is preferably 0.1 parts by mass or more, more preferably 0.3 parts by mass or more, even more preferably 0.5 parts by mass or more, preferably 20 parts by mass or less, more preferably 15 parts by mass or less, and even more preferably 10 parts by mass or less, relative to 100 parts by mass of the water-absorbing agent before surface-crosslinking. Setting the amount of water used to be within any of the above ranges improves the handleability of the surface-crosslinking agent solution and makes it possible to uniformly mix the surface-crosslinking agent with the water-absorbing agent before surface-crosslinking.

Alternatively, the surface-crosslinking agent solution may contain, as necessary, a hydrophilic organic solvent in combination with the water. In such a case, an amount of the hydrophilic organic solvent used is preferably 5 parts by mass or less, more preferably 3 parts by mass or less, and even more preferably 1 part by mass or less, relative to 100 parts by mass of the water-absorbing agent before surface-crosslinking. Specific examples of the hydrophilic organic solvent include a lower alcohol such as methyl alcohol; a ketone such as acetone; an ether such as dioxane; an amide such as N,N-dimethylformamide; a sulfoxide such as dimethyl sulfoxide; and a polyhydric alcohol such as ethylene glycol. However, the amount of these hydrophilic organic solvents used is preferably limited to a minimum amount.

Further, various additives to be added in "[3-7] Additives and step of adding additives" below can be each added to the surface-crosslinking agent solution in an amount in a range of 5 parts by mass or less. Alternatively, the additives can be added in the mixing step, separately from the surface-crosslinking agent solution.

(Method for Mixing and Conditions of Mixing)

A method for mixing the water-absorbing agent before surface-crosslinking with the surface-crosslinking agent solution can be a method in which a surface-crosslinking agent solution is prepared in advance, and the surface-crosslinking agent solution is mixed with the water-absorbing agent before surface-crosslinking preferably by spraying or dropping the surface-crosslinking agent solution onto the water-absorbing agent before surface-crosslinking, more preferably by spraying the surface-crosslinking agent solution onto the water-absorbing agent before surface-crosslinking.

A mixing apparatus for carrying out the mixing preferably has torque necessary to evenly and reliably mix the water-absorbing agent before surface-crosslinking with the surface-crosslinking agent. The mixing apparatus is preferably a high-speed stirring mixer and more preferably a high-speed stirring continuous mixer. The high-speed stirring mixer has a rotation speed which is preferably 100 rpm or more, more preferably 300 rpm or more, preferably 10000 rpm or less, and more preferably 2000 rpm or less.

The water-absorbing agent before surface-crosslinking supplied in this step has a temperature which is preferably 35° C. or more, preferably 80° C. or less, more preferably 70° C. or less, and even more preferably 60° C. or less, from the viewpoints of mixability with the surface-crosslinking agent solution and aggregability of the humidified mixture. Further, a mixing time is preferably 1 second or more, more preferably 5 seconds or more, preferably 1 hour or less, and more preferably 10 minutes or less.

[3-6-2] Heat Treatment Step

This step is a step of heating the humidified mixture, which has been obtained in the mixing step, so as to cause a crosslinking reaction on a surface of the water-absorbing agent before surface-crosslinking. The heat treatment of the humidified mixture may involve heating the humidified mixture in a still state or heating the humidified mixture in a fluid state with use of motive power such as that of stirring or the like. However, it is preferable to heat the humidified mixture while the humidified mixture is stirred because such a method makes it possible to heat the entirety of the humidified mixture uniformly. From the above viewpoint, examples of a heat treatment apparatus for carrying out the heat treatment include a paddle dryer, a multi-fin processer, and a tower dryer.

A heating temperature in this step is preferably 150° C. or more, more preferably 170° C. or more, even more preferably 180° C. or more, preferably 250° C. or less, and more preferably 230° C. or less, from such viewpoints as type and amount of surface-crosslinking agent, and water absorption performance of the water-absorbing agent. A heating time is preferably at least 5 minutes and more preferably at least 7 minutes. Controlling the heating temperature and the heating time to be within the above ranges is preferable because doing so improves the water absorption performance of the water-absorbing agent to be obtained.

[3-6-3] Cooling Step

This step is an optional step which is provided after the heat treatment step if needed. This step involves force-cooling the water-absorbing agent from its high temperature after the heat treatment step to a predetermined temperature and causing the surface-crosslinking reaction to finish quickly.

The cooling of the water-absorbing agent may involve cooling the water-absorbing agent in a still state or cooling the water-absorbing agent in a fluid state with use of motive power such as that of stirring or the like. However, it is preferable to cool the water-absorbing agent while the water-absorbing agent is stirred because such a method makes it possible to cool the entirety of the water-absorbing agent uniformly. From the above viewpoint, examples of a cooling apparatus for carrying out the cooling include a paddle dryer, a multi-fin processer, and a tower dryer. These cooling apparatuses can have similar specifications to the heat treatment apparatus used in the heat treatment step. This is because a heat treatment apparatus can be used as a cooling apparatus by changing a heating medium to a cooling medium.

A cooling temperature in this step may be set as appropriate in accordance with, for example, the heating temperature in the heat treatment step and the water absorption performance of the water-absorbing agent. The cooling temperature is preferably 40° C. or more, more preferably 50° C. or more, preferably 100° C. or less, more preferably 90° C. or less, and even more preferably 70° C. or less.

[3-7] Additive and Step of Adding Additive

[3-7-1] Aminocarboxylic Acid-Based Chelating Agent and/or Phosphorus-Based Chelating Agent, α-Hydroxycarboxylic Acid (Salt)

A method for producing the water-absorbing agent can further include the step of: adding an aminocarboxylic acid-based chelating agent and/or a phosphorus-based chelating agent and/or a α-hydroxycarboxylic acid (salt) to a water-absorbing agent after surface-crosslinking such that amount(s) of the aminocarboxylic acid-based chelating agent and/or the phosphorus-based chelating agent and/or the α-hydroxycarboxylic acid (salt) extracted is/are within the range defined by Formula (A) and Formula (B). An aspect including the step of adding the aminocarboxylic acid-based chelating agent and/or the phosphorus-based chelating agent and/or the α-hydroxycarboxylic acid (salt) can be encompassed within an embodiment of the present invention. The aminocarboxylic acid-based chelating agent and/or the phosphorus-based chelating agent, and the α-hydroxycarboxylic acid (salt) can each be any of the above-described examples.

The amount of the α-hydroxycarboxylic acid (salt) added is more than 0 mol % (or 0 mol % or more), preferably 0.04 mol % or more, more preferably 0.06 mol % (0.08 mol %) or more, and 0.41 mol % or less, preferably 0.37 mol % or less, and more preferably 0.33 mol % or less, relative to an amount of carboxyl group-containing unsaturated monomers contained in the water-absorbing agent. With this configuration, it is possible to achieve, in a more balanced manner, both good physical properties, in particular, physical properties of AAP and SFC, and a decrease in speed of coloration with lapse of time.

The amount of the aminocarboxylic acid-based chelating agent and/or the phosphorus-based chelating agent added is more than 0 mmol % (or 0 mmol % or more), preferably 0.4 mmol % or more, more preferably 0.8 mmol % or more, preferably 20 mmol % or less, more preferably 18 mmol % or less, even more preferably 16 mmol % or less, and particularly preferably 14 mmol % or less, relative to the amount of the carboxyl group-containing unsaturated monomers contained in the water-absorbing agent. With this configuration, it is possible to achieve, in a more balanced manner, both good physical properties and a decrease in speed of coloration with lapse of time. An amount of the aminocarboxylic acid-based and/or the phosphorus-based chelating agent added exceeding the above range is not preferable due to an economical disadvantage and also due to deterioration of a color tone of the water-absorbing agent by a color derived from the chelating agent(s) used.

[3-7-2] Surface-Modifying Agent

A surface-modifying agent is an additive that is added for the purpose of modifying the surface of particles of the water-absorbing agent. Specific examples include a liquid permeability improving agent, an anti-caking agent for a case where moisture has been absorbed, an agent for controlling powder fluidity, and a binder for the water-absorbing agent. Particularly, from the viewpoint of improving liquid permeability, at least one compound selected from the group consisting of a polyvalent metal salt, a cationic polymer, and inorganic fine particles can be used. If necessary, two or more compounds selected from the group can be used in combination. The amount of the surface-modifying agent added is set as appropriate in accordance with the compound(s) selected. For the purpose of modifying the surface of particles of the water-absorbing agent, a step of adding the surface-modifying agent is carried out preferably subsequent to the polymerization step, more preferably subsequent to the drying step, and even more preferably subsequent to the surface-crosslinking step. Further, the surface-modifying agent can be added in one or more steps.

(Polyvalent Metal Salt)

In a case where the polyvalent metal salt is used, a polyvalent metal cation of the polyvalent metal salt has a valence of preferably two or more, more preferably two or more, preferably four or less, and even more preferably three or four. Examples of polyvalent metals which can be used include aluminum and zirconium. As such, examples of polyvalent metal salts which can be used in this step include aluminum lactate, zirconium lactate, aluminum sulfate, and zirconium sulfate. Out of these examples, from the viewpoint of the effect of improving saline flow conductivity (SFC), the polyvalent metal salt is more preferably aluminum lactate or aluminum sulfate and even more preferably aluminum sulfate.

The amount of the polyvalent metal salt added is preferably 0 mol or more, preferably less than $3.6\times10^{-5}$ mol, more preferably less than $1.4\times10^{-5}$ mol, and even more preferably less than $1.0\times10^{-5}$ mol, relative to 1 g of the water-absorbing agent.

Further, a solution containing the polyvalent metal may further contain, as an agent for adjusting permeability of the polyvalent metal into the water-absorbing agent, a monovalent metal compound, such as sodium hydroxide, sodium carbonate, sodium hydrogen carbonate, sodium acetate, and sodium lactate.

(Cationic Polymer)

In a case where the cationic polymer is to be used, examples of the cationic polymer include the substances disclosed in U.S. Pat. No. 7,098,284. Out of these examples, a vinyl amine polymer is more preferable from the viewpoint of improving the liquid permeability. The cationic polymer has a mass average molecular weight of preferably 5000 to 1000000.

The cationic polymer can be added in an amount such that an amount of the cationic polymer is preferably more than 0 part by mass, preferably less than 2.5 parts by mass, more preferably less than 2.0 parts by mass, and even more preferably less than 1.0 part by mass, relative to 100 parts by mass of the water-absorbing agent.

(Inorganic Fine Particles)

In a case where inorganic fine particles are to be used, examples of the inorganic fine particles include the substances disclosed in U.S. Pat. No. 7,638,570. Out of these examples, silicon dioxide is preferable from the viewpoint of improving the liquid permeability.

In a case where the inorganic fine particles have a primary particle diameter of less than 20 nm, the inorganic fine particles can be added in an amount such that an amount of the inorganic fine particles is preferably more than 0 part by mass, preferably less than 1.2 parts by mass, more preferably less than 1.0 part by mass, and even more preferably less than 0.5 parts by mass, relative to 100 parts by mass of the water-absorbing agent. Further, in a case where the inorganic fine particles have a primary particle diameter of 20 nm or more, the inorganic fine particles can be added in an amount such that an amount of the inorganic fine particles is preferably more than 0 part by mass, preferably less than 2.0 parts by mass, more preferably less than 1.5 parts by mass, and even more preferably less than 1.0 part by mass, relative to 100 parts by mass of the water-absorbing agent.

[3-7-3] Another Additive

Examples of another additive include a reducing agent, a surfactant, a compound having a phosphorus atom, an oxidizer, an organic powder such as a metal soap, a deodorizing agent, an antibacterial agent, pulp, thermoplastic fibers, and aromatic substances such as terpene-based aromatic compounds and phenol-based aromatic compounds. One of these substances or two or more thereof can be used as the another additive.

The amount of the another additive added or contained is in a range of preferably 0.001 mass % to 1 mass % relative to a monomer or the water-absorbing agent.

The additive(s) can be added before, after, or during at least one step selected from among the aforementioned steps, i.e. the step of preparing an aqueous monomer solution, the polymerization step, the gel-crushing step, the drying step, the pulverizing step, the classification step, and the surface-crosslinking step. Preferably, the additive(s) is/are added before, after, or during any of the steps subsequent to the polymerization step.

[3-7-4] Step of Adding Additive

In a case where the additive(s) is/are each a liquid or a solution of an aqueous medium such as water, the addition of the additive(s) to the water-absorbing resin is carried out preferably by spraying the liquid or the solution onto the water-absorbing agent and evenly and reliably mixing the water-absorbing agent and the additive(s) by the application of sufficient torque. In a case where the additive(s) is/are each a solid in a powdery state or the like state, the additive(s) may be dry blended with the water-absorbing agent, and an aqueous liquid such as water may be used as a binder.

Specific examples of an apparatus for use in the mixing include a stirring mixer, a cylindrical mixer, a double-wall conical mixer, a V-shaped mixer, a ribbon mixer, a screw mixer, a flow and rotary disk mixer, an airflow mixer, a twin-arm kneader, an internal mixer, a pulverizing kneader, a rotating mixer, and a screw extruder. In a case where a stirring mixer is to be used, a rotation speed of the stirring mixer is preferably 5 rpm or more, more preferably 10 rpm or more, preferably 10000 rpm or less, and more preferably 2000 rpm or less.

[3-8] Sizing Step

In an embodiment of the present invention, it is possible to carry out a sizing step as necessary, in addition to the above-described steps. The sizing step is a step of adjusting a water-absorbing agent after surface-crosslinking obtained through the surface-crosslinking step to a particle size within a desired range so as to obtain a water-absorbing agent ready to be shipped as an end product, i.e., a water-absorbing agent. Note, however, that in a case where the pulverizing step and the classification step are absent before the surface-crosslinking step, the later-described operation carried out after the surface-crosslinking step is assumed to be the pulverizing step and the classification step. As a method for adjusting the particle size in the sizing step, an adjusting method similar to the method employed in the classification step can be employed. Furthermore, if the water-absorbing agent has aggregated in the surface-crosslinking step or the step of adding the surface-modifying agent, crushing, e.g. light pulverization, may be carried out, and mixing, e.g. mixing with use of a paint shaker or the like, may be carried out. Therefore, for example, classification with use of a sieve or the like can be carried out so as to satisfy a desired, mass average particle diameter (D50), a desired ratio of the mass average particle diameter (D50), and the like.

[3-9] Other Steps

In an embodiment of the present invention, it is possible to further include, as necessary, at least one step selected from, for example, a conveying step, a storing step, a packing step, and a reserving step, in addition to the steps described above.

An absorbent body of a sanitary material in an embodiment of the present invention consists of the water-absorbing agent in accordance with the present embodiment and a hydrophilic base material, and can further contain a fiber material such as hydrophilic fibers. Note that the absorbent body can be configured such that a complex containing the water-absorbing agent and hydrophilic fibers is sandwiched between hydrophilic base materials (pieces of hydrophilic nonwoven fabric, tissue paper, or the like) so that the complex and the hydrophilic base materials are integrated. The configuration of the absorbent body is not limited to these examples. For example, an absorbent body that is a complex which does not contain hydrophilic fibers and in which the water-absorbing agent is directly fixed onto sheet-like base materials of a hydrophilic base material (hydrophilic nonwoven fabric, tissue paper, or the like) can also be an absorbent body in an embodiment of the present invention. In a case where the absorbent body contains the hydrophilic fibers, examples of the structure of the absorbent body include a structure which contains the water-absorbing agent and the hydrophilic fibers being uniformly mixed. This structure is preferable in order for the effects of an embodiment of the present invention to be sufficiently exhibited. Examples of the structure include a structure formed by uniformly mixing a water-absorbing resin and hydrophilic fibers; a structure in which layered hydrophilic fibers are laminated on a layer in which a water-absorbing agent and hydrophilic fibers are uniformly mixed; and a structure in which a water-absorbing agent is sandwiched between layered hydrophilic fibers and a layer in which a water-absorbing agent and hydrophilic fibers are uniformly mixed. In addition to these structures, for example, a structure in which a water-absorbing agent is sandwiched in between layered hydrophilic fibers may be employed. Further, the absorbent body can have a structure in which a specific amount of water is added to a water-absorbing resin so that the water-absorbing resin is formed in a sheet-like shape.

Examples of the hydrophilic base material include a sheet-like base material of any of: polyethylene which has been subjected to a hydrophilization treatment; polypropylene which has been subjected, to a hydrophilization treatment; a polyester which has been subjected to a hydrophilization treatment; tissue paper; and the like (or a complex thereof).

Examples of the fiber material include hydrophilic fibers including, for example, cellulose fibers such as mechanical pulp obtained from wood, chemical pulp, semi-chemical pulp, and dissolving pulp and artificial cellulose fibers such as rayon and acetate. Of the above-described example fibers, cellulose fibers are preferable. Further, the hydrophilic fibers can contain synthetic fibers such as polyamide, polyester, and polyolefin. Note that the fiber material is not limited to the above-described example fibers.

A ratio of a mass of the water-absorbing agent to a mass of the absorbent body can be 75 mass % or more, can be 80 mass % or more, and can be 99 mass % or less or 95 mass % or less. In a case where a proportion of a fiber material, such as hydrophilic fibers, in the absorbent body is relatively small, the absorbent material, i.e. hydrophilic fibers can be bonded to one another with use of an adhesive binder. Bonding the hydrophilic fibers to one another makes it possible to increase the strength and shape retainability of the absorbent body before and during use of the absorbent body. Examples of the adhesive binder include: heat-fusing fibers such as polyolefin fibers such as polyethylene, polypropylene, ethylene-propylene copolymer, and 1-butene-ethylene copolymer; and emulsions having adhesiveness. It is possible to use only one of these adhesive binders or a mixture of two or more thereof. A weight ratio between the hydrophilic fibers and the adhesive binder is preferably in a range of 50/50 to 99/1, more preferably in a range of 70/30 to 95/5, and even more preferably 80/20 to 95/5.

Further, a sanitary material in accordance with an embodiment of the present invention is formed by sandwiching, in between a sheet having liquid permeability and a sheet having liquid impermeability, an absorbent layer including an absorbent body having the above structure. Such an absorbent article has excellent water absorbent properties as described above, due to including the absorbent layer including the absorbent body having the above-described structure. Specific examples of the absorbent article include hygienic materials and the like such as a disposable diaper, a sanitary napkin, and a so-called incontinence pad. The absorbent article is, however, not limited to any particular one. Since the absorbent article has excellent water absorbent properties, in a case where the absorbent article is, for example, a disposable diaper, the absorbent article can prevent leakage of urine and also provide a so-called dry feeling.

The sheet having liquid permeability (hereinafter referred to as a liquid permeable sheet) is composed of a material having the property of allowing a water-based liquid to pass therethrough. Examples of the material of the liquid permeable sheet include a nonwoven fabric; a woven fabric; and a porous synthetic resin film made of polyethylene, polypropylene, polyester, polyamide, or the like. The sheet having liquid impermeability (hereinafter referred to as a liquid impermeable sheet) is composed of a material having the property of not allowing a water-based liquid to pass therethrough. Examples of the material of the liquid impermeable sheet include: a synthetic resin film made of polyethylene, polypropylene, ethylene vinyl acetate, polyvinyl chloride, or the like; a film composed of a composite material of any of these synthetic resins and a nonwoven fabric; and a film composed of a composite material of any of the above-described synthetic resins and a woven fabric. Note that the liquid impermeable sheet may have the property of allowing a vapor to pass therethrough.

The structure of the absorbent layer is not particularly limited, provided that the absorbent layer includes the absorbent body. Further, a method for producing the absorbent layer is not particularly limited. Moreover, a method of sandwiching the absorbent layer between the liquid permeable sheet and the liquid impermeable sheet, i.e. a method for producing the absorbent article, is not particularly limited. Note that, by further adding, to the absorbent body, an additive such as a deodorizing agent, an antibacterial agent, a perfume, various kinds of inorganic powder, a foaming agent, a pigment, a dye, hydrophilic short fibers, a fertilizer, an oxidizing agent, a reducing agent, water, and a salt, various functions may be imparted to the absorbent body or the absorbent article.

An embodiment of the present invention can also be configured as follows. According to an aspect of the present invention, it is possible to provide, for example, a water-absorbing agent that has a large specific surface area and achieves, in a balanced manner, both good physical properties and a decrease in speed of coloration with lapse of time.

[1]

A surface-crosslinked water-absorbing agent having a non-uniformly pulverized shape and a specific surface area of 32 m$^2$/kg or more, a point plotted along an x-axis that represents an amount ($x_1$ mol %) of α-hydroxycarboxylic acid (salt) extracted from the water-absorbing agent and along a y-axis that represents an amount ($y_1$ mmol %) of an aminocarboxylic acid-based chelating agent extracted from the water-absorbing agent being within a range defined by Formula (A) and Formula (B):

$$y_1 \geq 0 \hspace{4cm} \text{Formula (A)}$$

$$0 \leq x_1 \leq 0.33 \hspace{4cm} \text{Formula (B)},$$

excluding a range defined by $y_1 \leq 28.7x_1^2 - 11.1x_1 + 1.07$ and $0 \leq x_1 < 0.19$.

[2]

The water-absorbing agent according to [1], wherein an amount of change between a WI value before a coloration test and a WI value after the coloration test is 40 or less, and the WI value before the coloration test is 42 or more, the coloration test being a test in which the water-absorbing agent is exposed for 7 days in an environment where a temperature is 70±1° C. and a relative humidity is 75±1 RH %.

[3]

The water-absorbing agent according to any one of [1] to [2], wherein the water-absorbing agent satisfies a relational formula of Formula (3) and a relational formula of Formula (4):

$$y_2 \geq 0.24x_2 + 18 \hspace{4cm} (3)$$

$$z_2 \geq -10x_2 + 306 \hspace{4cm} (4)$$

where $x_2$ represents CRC, $y_2$ represents AAP, $z_2$ represents SFC, and $x_2$ is a value of 26 or more and 32 or less.

[4]

A method for producing a surface-crosslinked water-absorbing agent having a non-uniformly pulverized shape and a specific surface area of 32 m$^2$/kg or more, the method including:

a preparation step of preparing an aqueous monomer solution containing a monomer and at least one polymerizable internal crosslinking agent, the monomer containing acrylic acid (salt) as a main component, the preparation step including adding, to the aqueous monomer solution, α-hydroxycarboxylic acid (salt) and an aminocarboxylic acid-based chelating such that a point plotted along an x-axis that represents an amount ($x_1$ mol %) of the α-hydroxycarboxylic acid (salt) extracted from the water-absorbing agent and along a y-axis that represents an amount ($y_1$ mmol %) of the aminocarboxylic acid-based chelating agent extracted from the water-absorbing agent is within a range defined by Formula (A) and Formula (B):

$$y_1 \geq 0 \hspace{4cm} \text{Formula (A)}$$

$$0 \leq x_1 \leq 0.33 \hspace{4cm} \text{Formula (B)},$$

excluding a range defined by $y_1 \leq 28.7x_1^2 - 11.1x_1 + 1.07$ and $0 \leq x_1 < 0.19$.

[5]
The method according to [4], further including:
  a surface-crosslinking step; and
  an addition step of adding, after the surface-crosslinking step, α-hydroxycarboxylic acid (salt) and/or an aminocarboxylic acid-based chelating agent to a water-absorbing agent obtained in the surface-crosslinking step, such that a point plotted along an x-axis that represents an amount ($x_1$ mol %) of the α-hydroxycarboxylic acid (salt) extracted from the water-absorbing agent, i.e. an end product, and along a y-axis that represents an amount ($y_1$ mmol %) of the aminocarboxylic acid-based chelating agent extracted from the water-absorbing agent, i.e. the end product, is within a range defined by Formula (A) and Formula (B):

$$y_1 \geq 0 \quad \text{Formula (A)}$$

$$0 \leq x_1 \leq 0.33 \quad \text{Formula (B)},$$

excluding a range defined by $y_1 \leq 28.7x_1^2 - 11.1x_1 + 1.07$ and $0 \leq x_1 < 0.19$.

EXAMPLES

The following description will discuss the present invention in more detail with reference to Examples and Comparative Examples. However, the present invention is not limited to these Examples.

<Measurement Method>

The following description will discuss a method of measuring a water-absorbing agent. In a case where the water-absorbing agent has been stored for a long period or in a case where the water-absorbing agent is taken out of a hygienic material such as an absorbent body or a disposable diaper, the water-absorbing agent may contain moisture and it may thus be not possible to measure a proper value. In a case where a moisture content of the water-absorbing agent at the time when the water-absorbing agent was produced is known (for example, the moisture content is written on a product inspection report), it is preferable to dry the water-absorbing agent under reduced pressure at approximately 80° C. until a predetermined moisture content is achieved, and then subject the water-absorbing agent to measurement. In a case where a moisture content of the water-absorbing agent at the time when the water-absorbing agent was produced is unknown, it is preferable to adjust a moisture content of the water-absorbing agent to 10 mass % or less, and then subject the water-absorbing agent to measurement. Examples of a method for adjusting the moisture content of the water-absorbing resin (water-absorbing agent) to 10 mass % or less include a method for drying the water-absorbing resin (water-absorbing agent) at 80° C. and under reduced pressure (10.0 kPa or less) for 24 hours.

(a) CRC (Absorption Capacity without Load)

A CRC (absorption capacity without load) of the water-absorbing agent in accordance with an embodiment of the present invention was measured in conformity with NWSP 241.0.R2 (15). Specifically, the CRC (absorption capacity without load) (unit: g/g) was measured after 0.2 g of water-absorbing agent contained in a nonwoven fabric bag was immersed in a large excess of a 0.9 mass % aqueous sodium chloride solution for 30 minutes so as to be allowed to freely swell, and then the water-absorbing agent was drained with use of a centrifuge (centrifugal force: 250 G).

(b) AAP (Absorption Capacity Under Load)

An AAP (absorption capacity under load) of the water-absorbing agent in accordance with an embodiment of the present invention was measured in conformity with NWSP 242.0.R2 (15). Note, however, that in the present invention, the load used during measurements was changed to 4.83 kPa (49 g/cm$^2$, 0.7 psi). Specifically, the AAP (absorption capacity under load) (unit: g/g) was measured after 0.9 g of water-absorbing agent was allowed to swell for 1 hour under a load of 4.83 kPa (49 g/cm$^2$, 0.7 psi) with use of a large excess of a 0.9 mass % aqueous sodium chloride solution. That is, in the present specification, all AAP (absorption capacity under load) measurements are values measured under a load of 4.83 kPa.

(c) SFC (Saline Flow Conductivity)

A saline flow conductivity (SFC) (unit: $\times 10^{-7}$ cm$^3$·sec/g) of the water-absorbing agent in accordance with an embodiment of the present invention was measured in conformity with a measurement method disclosed in U.S. Pat. No. 5,669,894. Specifically, the SFC of the water-absorbing agent was measured in accordance with the following procedure.

First, 1.50 g of the water-absorbing agent was uniformly placed in a SFC measurement container, and was immersed in artificial urine under a load of 2.1 kPa for 60 minutes to obtain a swollen gel. A gel layer height (L0) of the swollen gel was measured, and then 0.69 mass % aqueous sodium chloride solution was allowed to pass through the swollen gel layer at a constant hydrostatic pressure (ΔP). At this time, the load of 2.1 kPa was kept being applied to the swollen gel layer.

While the 0.69 mass % aqueous sodium chloride solution was allowed to pass through the swollen gel layer, an amount of liquid passing through the gel layer was recorded at 20 second intervals for 10 minutes as a function of time with use of a computer and a balance.

A flow rate Fs (T) (unit: g/s) of the liquid passing through the swollen gel was determined by dividing an increase (g) in mass by a time increment. A time during which a constant hydrostatic pressure and a stable flow rate Fs were obtained was defined as Ts, and a value of Fs (T=0) (i.e., a flow rate Fs (T=0) of the first flow that passes through the swollen gel) was calculated with use of only Ts and data obtained during the 10 minutes. Note that Fs (T=0) was determined by extrapolating, into T=0, a result of the least-squares method with respect to Fs (T) vs time.

From the above-described operation and the size of the measurement device, an SFC (unit: $\times 10^{-7}$·cm$^3$·s·g$^{-1}$) of the water-absorbing agent was determined in accordance with Formula (a) below.

$$SFC = (Fs(T=0) \times L0)/(\rho \times A \times \Delta P) \quad \text{Formula (a)}$$

In Formula (a),
  Fs (T=0) represents the flow rate (unit: g/s) of the first flow that passes through the gel layer,
  L0 represents a layer height (unit: cm) of the gel layer that has been allowed to swell with use of artificial urine,
  ρ represents a density (unit: g/cm$^3$) of the 0.69 mass % aqueous sodium chloride solution,
  A represents an area (unit: cm$^2$) of an upper surface of the gel layer, and
  ΔP represents a hydrostatic pressure (dyne/cm$^2$) applied to the gel layer.

Note that in a case where the liquid passes through so fast that the hydrostatic pressure is below the above value, changing the value of ΔP to a value calculated from a height of a liquid surface of the aqueous sodium chloride solution allows determining an SFC.

The artificial urine used was obtained by dissolving, in 994.25 g of deionized water, 0.25 g of calcium chloride dihydrate, 2.0 g of potassium chloride, 0.50 g of magnesium chloride hexahydrate, 2.0 g of sodium sulfate, 0.85 g of ammonium dihydrogen phosphate, and 0.15, g of diammonium hydrogen phosphate.

(d) Initial Color Tone and Color Tone with Lapse of Time

An initial color tone and a color tone with the lapse of time of the water-absorbing agent in accordance with an embodiment of the present invention were measured in the Hunter's Lab color system. As a measurement device, LabScan (registered trademark) XE manufactured by HunterLab was used, reflection measurement was selected as a measurement condition, and 1 inch or 1.75 inches was selected as a measurement diameter. The size of a container for measuring an initial color tone was changed according to the measurement diameter (a container having an inner diameter of 5.5 cm and a height of 1 cm was used in a case where the measurement diameter was 1 inch, and a container having an inner diameter of 9.5 cm and a height of 0.6 cm was used in a case where the measurement diameter was 1.75 inches), and the container for measuring an initial color tone was made of aluminum or stainless steel.

Next, the water-absorbing agent was gradually introduced into the container for measuring an initial color tone so that the container was filled with the water-absorbing agent until the water-absorbing agent was spilt out of the container. The water-absorbing agent that had been heaped to a level higher than the upper surface of the container was leveled off with a ruler or the like. Then, in an atmosphere in which a temperature was a room temperature (20° C. to 25° C.) and a relative humidity was 50% RH, an L value, an a value, a b value, a WI value, and a YI value of a surface of the water-absorbing agent were measured.

Note that, in a (ordinary) case where the water-absorbing agent is a water-absorbing agent immediately after production or before shipment from a factory or in a case where the water-absorbing agent is a water-absorbing agent stored for 1 year or less after production in an atmosphere in which an air temperature is 30° C. or less and a relative humidity is 50% RH, a color of such a water-absorbing agent was regarded as an "initial tone color".

Further, in a case where the water-absorbing agent is a water-absorbing agent after a colorations acceleration test described below, a color of such a water-absorbing agent was regarded as a "color tone with the lapse of time".

The colorations acceleration test is a test in which 12 g to 14 g of a water-absorbing agent, with which a petri dish is uniformly filled, is exposed for 7 days in an environment in a thermo-hygrostat (a small-seized environmental testing instrument; ESPEC CORP.; MODEL: SH-641) having a temperature adjusted to 70±1° C. and a relative humidity adjusted to 75±1% RH. The petri dish was a petri dish that, when left to stand still, is sealed to a proper extent due to the weight of the petri dish itself bringing an upper dish and a lower dish into close contact with each other. The petri dish had an inner diameter of 90 mm and a height of 15 mm and was made of plastic. Specific examples of the petri dish include a petri dish manufactured by BIO-BIK (MODEL: I-90).

(e) Initial Color Tone and Color Tone with Lapse of Time of Simulated Absorbent Body The following description will discuss a color tone evaluation method in which actual use of a sanitary material such as a disposable diaper is assumed. The color tone evaluation method is carried out basically in accordance with the method described above in "(d) Initial color tone and color tone with lapse of time". In measuring initial coloration and coloration with lapse of time in the Hunter's Lab color system, however, a sheet of filter paper was placed over the absorbent body in each container so as to cover the absorbent body. The sheet of filter paper used was a sheet of qualitative filter paper manufactured by ADVANTEC (model: No. 2, Φ: 110 mm), which was cut in advance so as to fit in the container for measuring an initial color tone and the container for measuring coloration with lapse of time. Note that an amount of change between an initial color tone and a color tone with the lapse of time is expressed by the following formula:

$$\Delta WI\text{(amount of change)} = |WI\text{(color tone with lapse of time: after coloration test)} - WI\text{(initial color tone:before coloration test)}|$$

(f) FSR (Water Absorption Speed)

A surface-crosslinked water-absorbing agent in accordance with an embodiment of the present invention is such that a water absorption speed (FSR) of 1 g of the water-absorbing agent with respect to 20 g of physiological saline is 0.31 g/g/s or more, more preferably 0.34 g/g/s or more, and even more preferably 0.37 g/g/s or more. An upper limit of the water absorption speed (FSR) is not particularly limited, but is generally 1.0 g/g/s or less. Note that a method of measuring FSR is defined by the pamphlet of International Publication No. WO 2009/016055.

(g) Specific Surface Area

A specific surface area according to the water-absorbing agent was determined by the following method in which an image captured by X-ray CT was analyzed with use of analysis software.

<Image Capturing by X-Ray CT>

1.0 g of the water-absorbing agent in accordance with an embodiment of the present invention was put in a resin container (Maruemu container No. 1, 2.5 mL) and was shaken to mix well so as to be uniform in particle size. Then, measurement was carried out with use of Microfocus X-ray CT system inspeXio SMX-100CT manufactured by Shimadzu Corporation. Measurement conditions are shown below.

Image width size (pixel): 512
Image length size (pixel): 512
X-ray tube voltage (kV): 50
X-ray tube current (μA): 40
Inch size (inch): 4.0
X-ray filter: None
SDD (distance between focal point of X-ray source and X-ray detector) (mm): 500
SRD (distance between focal point of X-ray source and rotation center of measurement sample) (mm): 40
Scan mode 1: CBCT
Scan mode 2: Normal scan
Scan angle: Full scan
Number of views: 1200
Average number: 5
Smoothing: YZ
Slice thickness (mm): 0.008
Distance between slices (mm): 0.010
Scaling number: 50
BHC data: None
Fine mode: Available
FOV XY (maximum image capture region XY) (mm): 5
FOV Z (maximum image capture region Z) (mm): 4
Voxel size (mm/voxel): 0.010

<Calculation of Specific Surface Area>

Image data captured by X-ray CT was analyzed by the following procedure with use of analysis software TRI/3D-PRT-LRG manufactured by Ratoc System Engineering Co., Ltd.

1. From the menu, Particle Measurement>3D Particles>Particle Separation>Giant Particle Separation were selected. By this operation, the EV panel, the BC panel, the EVC panel, and the Giant Particle Separation panel were displayed.

2. In the Binarize tab on the EVC panel, L-W was selected, and the L value was changed, so that a circular measurement target region was selected. After the measurement target region was selected, "Execute" was pressed. This processing was applied to all sliced images (as a result, a columnar measurement region was selected as a whole). After this operation, "ROI OK" on the Giant Particle Separation panel was pressed.

3. In the Binarize tab on the EVC panel, L-W was selected, and the L value was set to 37580. By this operation, only the particles of the water-absorbing agent were selected. Next, "Execute" was pressed. Further, bD on the BC panel was selected and "Save" was pressed.

4. In the Binary tab on the EVC panel, the ErsSml tab was selected. The particle size was set to 10 and "Execute" was pressed. By this operation, small noise was removed.

5. In the Binary tab on the EVC panel, the Invert tab was selected, and "Execute" was pressed. Likewise, the ErsSml tab on the EVC panel was selected, the particle size was set to 10, and "Execute" was pressed. Likewise, the Labeling tab on the EVC panel was selected, Volume and Max were selected, the fine particle size was set to 100, and "Execute" was pressed. The Invert tab was selected again, and "Execute" was pressed. By this operation, small noise in the particles was removed, and independent voids were filled. Then, "Particle Separation Target OK" on the Giant Particle Separation panel was pressed. By this operation, the target region was saved in b1 on the BC panel.

6. In the L Op tab (inter-channel logical operation processing) on the EVC panel, bD was subtracted from b1. Then, in the Binary tab on the EVC panel, the ErsSml tab was' selected, the particle size was set to 10, and "Execute" was pressed. By this operation, independent voids were extracted. Then, b6 on the BC panel was selected, and "Save" was pressed.

7. b1 on the BC panel was selected, and "Display" was pressed. Then, Small Particle Extraction on the Giant Particle Separation panel was selected (Large Particle Extraction was not selected), "0" was set for each of Constriction Proportion, Repair Filter Size, and Repair Mrg Sml Diameter, and "Exec" was pressed. By this operation, separation and color sorting of particles were performed.

8. In the 3D tab on the EVC panel, the Labeling tab was selected, Coordinate Value (Cycle) was selected, and Fine Particle Size was set to "10", and "Execute" was pressed. By this operation, color sorting of particles was performed again in the order of coordinates.

9. From the menu, Particle Measurement>Voids in 3D Particles>Post-Separation Measurement were selected. After separation, the Measurement panel was displayed. Edge Particle Removal, Surface Area Calculation, and Void Calculation were selected, Binary 5ch was selected as a measurement ROI designation, "Register OK" was pressed, and a folder in which data is to be saved was selected. Then, "Execute Latest Registered Data" was pressed, so that calculation processing was performed.

10. From the obtained calculation result, a specific surface area was calculated in accordance with the following formula.

Specific surface area$(m^2/kg)$=total surface area of particles$(mm^2)$/[{total volume of particles $(mm^3)$−total volume of voids$(mm^3)$}×true density$(g/cm^3)$]

(h) True density

Closed cells present inside the water-absorbing resin normally have a diameter of 1 μm to 300 μm. In pulverization, the water-absorbing resin starts breaking from portions near the closed cells. In view of this, if the water-absorbing resin powder is pulverized until the particle size reaches a size less than 45 μm, the resultant water-absorbing resin powder contains almost no closed cells. Therefore, the dry density of the water-absorbing resin powder having been pulverized to less than 45 μm was used as a true density for evaluation. Specifically, 10.0 g of the water-absorbing resin powder and 500 g of columnar porcelain balls (diameter: 13 mm, length: 13 mm) were placed in a ball mill pot (available from TERAOKA, model No. 90, internal dimensions: 80 mm in diameter and 75 mm in height, external dimensions: 90 mm in diameter and 110 mm in height), and then the ball mill pot was operated at 60 Hz for 7 hours, such that a water-absorbing resin which pass through a JIS standard sieve having a mesh size of 45 μm (a water-absorbing resin having a particle size less than 45 μm) was obtained. Then, 3.5 g of that water-absorbing resin powder having a particle size of less than 45 μm was allowed to stand for 3 hours or longer in a windless dryer at 180° C. until the moisture content of the water-absorbing resin powder reached 1 weight % or less, such that the water-absorbing resin powder was thoroughly dried. Then, the dry density of the dried water-absorbing resin powder was measured with the use of an automatic dry densimeter (AccuPycII 1340TC-10CC, manufactured by Shimadzu Corporation/carrier gas: helium). The measured value thus obtained was regarded as the "true density" of an embodiment of the present invention.

(i) Moisture Absorbing Speed

A weight ($g_1$) of an empty petri dish to be used was measured, and then 3±0.01 g ($g_2$) of the water-absorbing agent was introduced into the petri dish. The water-absorbing agent that had been heaped inside the container was leveled off with a ruler or the like. The petri dish had an inner diameter of 90 mm and a height of 15 mm and was made of plastic. Specific examples of the petri dish include a petri dish manufactured by BIO-BIK (MODEL: I-90).

Figure 3:
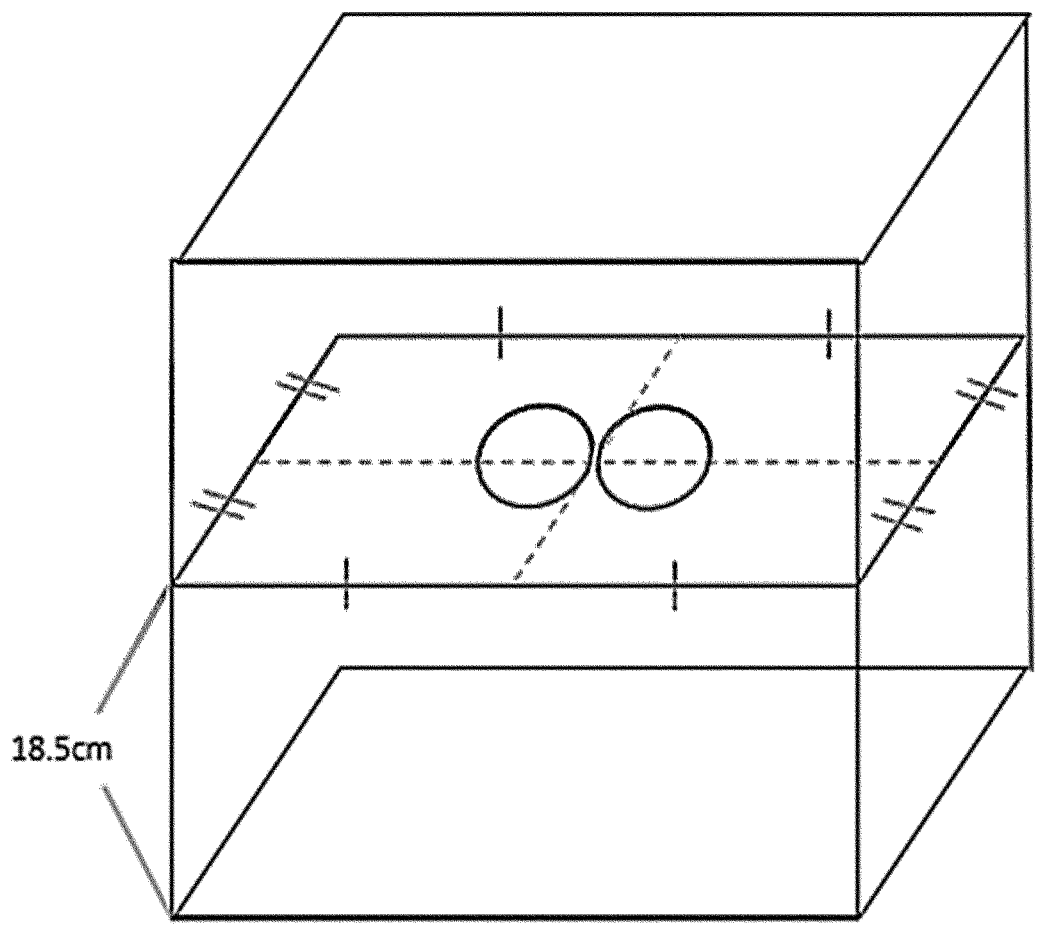
FIG. 3 is a view schematically illustrating a configuration of a thermo-hygrostat used in measurement of a moisture absorbing speed in the Examples and the Comparative Examples of the present invention.

A metal gauze, which was included with a thermo-hygrostat (manufactured by ESPEC CORP.; MODEL: SH-641), was hang on protrusions provided at a height of 18.5 cm from the bottom surface inside the thermo-hygrostat, and a temperature and a relative humidity of the thermo-hygrostat were adjusted to 40±1° C. and 75% RH, respectively. After the setting of the thermo-hygrostat was completed, the petri dish into which the water-absorbing material had been introduced was set in the two positions indicated by the circles in FIG. 3. Specifically, two petri dishes were placed side by side such that a central portion of the metal gauze, which was included with the thermo-hygrostat, was sandwiched between the two petri dishes. Then, the petri dishes were left to stand still for 1 hour. An average value of values measured at two portions of the same sample was regarded as the moisture absorbing speed. During the measurement, the water-absorbing agent was allowed to absorb moisture in an open system without being covered with a lid, which was included with the petri dish.

After one hour elapsed, the petri dishes, which were placed in the two positions and containing the water-absorbing agent, were taken out, and was left to stand still for 30 minutes atmosphere in which the temperature was a room temperature (20° C. to 25° C.) and the relative humidity was 15±5% RH. Then, a weight ($g_3$) of each petri dish containing the water-absorbing agent that had absorbed moisture was measured, and a moisture absorbing speed of the water-absorbing agent was derived in accordance with the following formula.

$$(\text{Moisture absorbing speed}) = \{(g_3)-(g_2)-(g_1)\} \times 1000/(g_2) \text{Unit}:mg/g/h$$

As $g_1$, $g_2$, and $g_3$, values each measured to the fourth decimal place was used. An average value of the respective moisture absorbing speeds was used as data.

(j) Method of Measuring α-Hydroxycarboxylic Acid (Salt) Content in Water-Absorbing Agent A method of quantifying α-hydroxycarboxylic acid (salt) in the water-absorbing agent ii accordance with an embodiment of the present invention is not particularly limited. For example, the quantification can be performed by extracting a soluble component from the water-absorbing agent and analyzing the soluble component by use of high-performance liquid chromatography. Specifically, the quantification can be performed by the following method.

(Extraction of Soluble Component)

1.0 g of the water-absorbing agent in accordance with an embodiment of the present invention was added to 100 mL of a 0.9 mass % aqueous sodium chloride solution, and the resultant mixture was stirred at 500 rpm for 1 hour. A supernatant of the resultant solution was filtered with use of a syringe filter (manufactured by GL Sciences Inc.; aqueous <A type>; MODEL: 25A; pore diameter: 0.45 μm) and was considered to be an extracted solution.

(Quantitative Analysis by High-Performance Liquid Chromatography)

High-performance liquid chromatography for quantifying α-hydroxycarboxylic acid (salt) can be designed, for example, as follows.

Pump: L-7110 (manufactured by Hitachi High-Tech Science Corporation), flow rate: 1.0 mL/min Autosampler: L-7200 (manufactured by Hitachi High-Tech Science Corporation), Pouring amount: 50 μL Column oven: L-7300 (manufactured by Hitachi High-Tech Science Corporation), temperature setting: 30° C.

Differential refractometer: L-7490 (manufactured by Hitachi High-Tech Science Corporation)

Column: Shim-pack SCR-101H (manufactured by SHIMADZU GLC Ltd.)

Guard column: Shim-pack SCR(H) (manufactured by SHIMADZU GLC Ltd.)

Mobile phase: 0.36 wt % aqueous phosphoric acid solution

First, α-hydroxycarboxylic acid (salt) to be quantified was dissolved in a 0.9 mass % aqueous sodium chloride solution to prepare an α-hydroxycarboxylic acid (salt) solution having a given concentration. This solution was analyzed with use of the high-performance liquid chromatography as designed above, and a calibration curve was created on the basis of a relationship between the concentration of α-hydroxycarboxylic acid (salt) and a peak area of the obtained chromatograph.

Then, the extracted solution was analyzed with use of the high-performance liquid chromatography, and an amount of α-hydroxycarboxylic acid (salt) was calculated on the basis of a relationship between the obtained peak area of the chromatograph and the calibration curve.

The results of the quantification are indicated in the Examples below.

(k) Method of Measuring Diethylenetriamine Pentaacetic Acid/Trisodium (DTPA·3Na) Content in Water-Absorbing Agent A content of diethylenetriamine pentaacetic acid/trisodium (DTPA·3Na) in the water-absorbing agent in accordance with an embodiment of the present invention was analyzed in accordance with the method disclosed in Patent Literature (the pamphlet of International Publication No. WO 2015/053372) by extracting a chelating agent contained in the water-absorbing agent.

Specifically, 1 g of the water-absorbing agent in the form of particles was added to 100 g of physiological saline (a 0.9 mass % aqueous sodium chloride solution), and the resultant mixture was stirred for 1 hour (stirring rotation speed: 500±50 rpm) at a room temperature, so that the chelating agent was extracted into the physiological saline to obtain an extracted solution.

Then, a supernatant of the obtained extracted solution was allowed to pass through an HPLC sample pretreating filter (Chromatodisc 25A/aqueous type, pore size: 0.45 μm/Kurabo Industries Ltd.), and a content of the chelating agent in the filtrate was measured with use of high-performance liquid chromatography (HPLC).

The content of the chelating agent in the water-absorbing agent in the form of particles was determined with use of, as an external standard, a calibration curve obtained by measuring a monomer standard solution having a known concentration and in consideration of a dilution ratio of the water-absorbing agent in the form of particles to the physiological saline. Then, each quantification was carried out under the following measurement conditions of HPLC.

Measurement Conditions:

<Eluent> A mixed solution of 0.3 ml of 0.4 mol/L aqueous alum solution, 450 ml of 0.1 N aqueous potassium hydroxide solution, 3 ml of 0.4 mol/L aqueous tetra-n-butylammonium hydroxide solution, 3 ml of sulfuric acid, 1.5 ml of ethylene glycol, and 2550 ml of ion exchange water <Column> LichroCART 250-4 Superspher 100 RP-18e (4 μm) (manufactured by Merck)

<Column temperature> 23±2° C.

<Flow rate> 1 ml/min

<Detector> UV, wavelength 258 nm

The content of the chelating agent is affected by a moisture content. As such, In an embodiment of the present invention, the content of the chelating agent is a value corrected on the basis of a moisture content, and is a value converted per 100 parts by mass of a solid content of the water-absorbing agent.

In a case where the chelating agent is an anionic chelating agent, it is assumed, for convenience, that a salt of the added chelating agent is not salt-exchanged but is present in the water-absorbing agent.

PRODUCTION EXAMPLES

Production Example 1

As a device for producing a water-absorbing agent in accordance with an embodiment of the present invention, there was prepared a continuous production device constituted by: devices for carrying out polymerization, gel-crushing, drying, pulverization, classification, surface-crosslinking (mixing, a heating treatment, cooling), and particle sizing; a transportation device for linking these devices; and other supplemental equipment. Acrylic acid as a raw material contained a methoxyphenol in an amount of 10 ppm to 70 ppm, Fe in an amount of 0.3 ppm or less, and protoanemonin, allyl acrylate, allyl alcohol, an aldehyde content, maleic acid, and benzoic acid in a total amount of 10 ppm or less.

First, there was prepared an aqueous monomer solution (a) containing 300 parts by mass of acrylic acid, 125.2 parts by mass of a 48 mass % aqueous sodium hydroxide solution (Fe content: 1 ppm), 0.76 parts by mass of polyethylene glycol diacrylate (average n number: 9), 18.4 parts by mass of a 0.1 mass % aqueous diethylenetriamine pentaacetic acid/trisodium (DTPA·3Na) solution (0.96 mmol % relative to a carboxyl group-containing unsaturated monomer), 1.1 parts by mass of a 50 mass % D,L-malic acid solution (0.10 mol % relative to the carboxyl group-containing unsaturated monomer), and 226.8 parts by mass of deionized water. Note that a temperature of the aqueous monomer solution (a) was adjusted to approximately 40° C.

Next, the aqueous monomer solution (a) was continuously fed to the polymerization device with use of a liquid feed pump. During the feeding, 130.8 parts by mass of a 48 mass % aqueous sodium hydroxide solution was additionally fed to the aqueous monomer solution (a), and the resultant mixture was mixed with use of a static mixer provided in a pipe. Then, 14.6 parts by mass of a 4 mass % aqueous sodium persulfate solution was further added as a polymerization initiator, and the resultant mixture was mixed with use of the static mixer provided in the pipe. The polymerization device was a planar endless belt polymerization device including barriers each respectively provided on both ends thereof.

After the addition of the polymerization initiator, the aqueous monomer solution (a) was fed to the polymerization device and then started to be polymerized. The polymerization was continuously carried out, so that a belt-shaped crosslinked hydrogel polymer (hereinafter referred to as "hydrogel") (a) was obtained. A polymerization time was 3 minutes.

The hydrogel (a) obtained through the above-described polymerization step was cut to an appropriate size. Then, the hydrogel (a) was fed, in a constant amount per unit time, to a screw extruder including a discharge orifice and a porous plate provided at the discharge orifice, and was subjected to gel-crushing such that a particulate hydrogel (a) was obtained (screw rotation speed: 110 rpm).

Subsequently, the particulate hydrogel (a), prepared through the above-described gel-crushing step, was dried in a continuous through-flow belt-type dryer (at 185° C. for 29 minutes). Thus, a dried polymer (a) was obtained. Next, the dried polymer (a) was continuously fed to a roll mill and subjected to pulverization, and was further subjected to classification with use of a JIS standard sieve having a mesh size of 850 µm and a JIS standard sieve having a mesh size of 180 µm. Thus, a water-absorbing agent (water-absorbing agent before surface-crosslinking) (a) having a non-uniformly pulverized shape was obtained.

Next, to 100 parts by mass of the water-absorbing agent (a) before surface-crosslinking, a surface-crosslinking agent solution containing 0.3 parts by mass of ethylene carbonate, 0.5 parts by mass of propylene glycol, 0.02 parts by mass of DENACOL, and 2.1 parts by mass of deionized water was added and mixed uniformly. After that, a mixture thus obtained was subjected to a heating treatment at 185° C. for 35 minutes to obtain a surface-crosslinked water-absorbing agent (a).

Production Example 2

Into a 2-liter polypropylene container were introduced 398.6 g of acrylic acid, 26.03 g (0.085 mol % relative to a carboxyl group-containing unsaturated monomer) of a 10 mass % polyethyleneglycol diacrylate acrylic acid solution (molecular weight: 523) as an internal crosslinking agent, 1.29 g (0.96 mmol % relative to the carboxyl group-containing unsaturated monomer) of a 2.0 mass % aqueous diethylenetriamine pentaacetic acid/trisodium (DTPA·3Na) solution, 1.55 g (0.10 mol % relative to the carboxyl group-containing unsaturated monomer) of a 50 mass % D,L-malic acid solution (manufactured by FUSO CHEMICAL CO., LTD., food additive grade), 173.9 g of a 48.5 mass % aqueous sodium hydroxide solution, and 401.6 g of deionized water (ion exchange water). These substances were mixed so that an aqueous monomer solution (b') was prepared.

Next, the aqueous monomer solution (b') was cooled while being stirred. At a time point at which the liquid temperature reached 39° C., 178.7 g of a 48.5 mass % aqueous sodium hydroxide solution having a temperature adjusted to 40° C. was added to the aqueous monomer solution (b'). These substances were mixed so that an aqueous monomer solution (b) was prepared. At this time, the temperature of the aqueous monomer solution (b) increased to 76.5° C. due to heat of neutralization at a second stage immediately after the preparation of the aqueous monomer solution (b). A precipitate was observed immediately after the start of the mixing of the 48.5 mass % aqueous sodium hydroxide solution, but was gradually dissolved. In this way, the aqueous monomer solution (b) became a transparent uniform solution.

Next, to the aqueous monomer solution (b) in a state of being stirred, 18.4 g of a 4.5 mass % aqueous sodium persulfate solution was added, and then the resultant mixture was immediately poured into a stainless steel vat-type vessel (with a bottom surface of 340 mm×340 mm and a height of 25 mm; inner surface: Teflon (registered trademark) coating) in an atmospheric air open system. Note that pouring of the aqueous monomer solution (b) into the vat-type vessel commenced 1 minute after the start of the second-stage neutralization. The vat-type vessel was heated with use of a hot plate (NEO HOTPLATE HI-1000; manufactured by Iuchi Seiei Do Ltd.) until a surface temperature reached 50° C.

After the aqueous monomer solution (b) was poured into the vat-type vessel, a polymerization reaction commenced within 60 seconds. As the polymerization reaction proceeded, the polymerization reaction caused a reaction product (hydrogel (b)) to expand and foam upward in various directions while water vapor was generated. Thereafter, the reaction product (hydrogel (b)) contracted to a size slightly larger than the vat-type vessel. The hydrogel (b) was removed after 2 minutes had passed since the commencement of the polymerization reaction. Note that this series of operations was carried out in an atmospheric air open system.

The hydrogel (b) obtained through the above-described polymerization reaction was crushed with use of a meat chopper (32 type; plate pore diameter: 6.4 mm; manufactured by Hiraga Seisakusho), so that a particulate hydrogel (b) was obtained.

The hydrogel (b) was introduced into the meat chopper at a rate of 4640 g/min. The gel-crushing was carried out while deionized water having a temperature adjusted to 90° C. and a vapor were being added, at a rate of 60 g/min and 106 g/min, respectively, to the meat chopper simultaneously with the introduction of the hydrogel (b).

This grain-refined hydrogel (b) was spread onto a metal gauze (50 mesh) and dried with hot air at 190° C. for 30 minutes. A dried material thus obtained was pulverized with use of a roll mill (WML-type roll pulverizer; manufactured by Inoguchi Giken Ltd.) and further classified with use of JIS sieves having respective mesh sizes of 710 μm, 600 μm, 500 μm, 425 μm, 300 μm, 150 μm, and 45 μm. Thus obtained was a water-absorbing agent (water-absorbing agent before surface-crosslinking) (b) having a non-uniformly pulverized shape and a mass average particle diameter (D50) of 370 μm.

To 100 parts by mass of the water-absorbing agent (b) before surface-crosslinking, a surface-crosslinking agent solution containing 0.65 parts by mass of triethylene glycol, 0.23 parts by mass of 1,6-hexanediol (manufactured by Ube Industries, Ltd.), 2.63 parts by mass of deionized water (ion exchange water), and 0.01 parts by mass of 10 mass % polyoxyethylene (20) sorbitan monostearate (manufactured by Kao Corporation) was added and mixed uniformly. After that, a mixture thus obtained was subjected to surface-crosslinking by a heating treatment at 200° C. for 35 minutes to 55 minutes.

After the heating treatment, a water-absorbing agent (b") thus surface-crosslinked was crushed until the surface-crosslinked water-absorbing agent (b") passed through a JIS standard sieve having a mesh size of 850 μm. Thus, a surface-crosslinked water-absorbing agent (b') was obtained. Into a 225-milliliter bottle, 35 g of the surface-crosslinked water-absorbing agent (b') was put together with 10 g of marbles and then mixed by shaking for 20 minutes with use of a paint shaker (manufactured by Toyo Seiki Seisaku-sho, Ltd.), so that a surface-crosslinked water-absorbing agent (b) was obtained.

Raw material compounds, reaction reagents, and solvents used in Examples and Comparative Examples are commercially available ones (for example, those which are sold by Nippon Shokubai Co., Ltd.), unless otherwise specified.

COMPARATIVE EXAMPLES

Comparative Example 1

The surface-crosslinked water-absorbing agent (a) obtained by the method of Production Example 1 was considered to be a comparative water-absorbing agent (1). Tables 3 and 4 show performance of the comparative water-absorbing agent (1).

Comparative Example 2

The surface-crosslinked water-absorbing agent (b) obtained by the method of Production Example 2 was considered to be a comparative water-absorbing agent (2). Tables 3 and 4 show performance of the comparative water-absorbing agent (2).

Comparative Example 3

Operations similar to those of Production Example 2 were carried out except that: an amount of a 10 mass % polyethyleneglycol diacrylate acrylic acid solution (molecular weight: 523) added was changed to 30.63 g (0.1 mol % relative to a carboxyl group-containing unsaturated monomer); and an amount of a 50 mass % D,L-malic acid solution (manufactured by FUSO CHEMICAL CO., LTD., food additive grade) added was changed from 1.55 g to 10.32 g (from 0.10 mol % to 0.66 mol % relative to the carboxyl group-containing unsaturated monomer). A surface-crosslinked water-absorbing agent thus obtained was considered to be a comparative water-absorbing agent (3). Tables 3 and 4 show performance of the comparative water-absorbing agent (3).

Comparative Example 4

Operations similar to those of Production Example 2 were carried out except that: an amount of a 10 mass % polyethyleneglycol diacrylate acrylic acid solution (molecular weight: 523) added was changed to 28.79 g (0.094 mol % relative to a carboxyl group-containing unsaturated monomer); and an amount of a 50 mass % D,L-malic acid solution (manufactured by FUSO CHEMICAL CO., LTD., food additive grade) added was changed from 1.55 g to 7.22 g (from 0.10 mol % to 0.46 mol % relative to the carboxyl group-containing unsaturated monomer). A surface-crosslinked water-absorbing agent thus obtained was considered to be a comparative water-absorbing agent (4). Tables 3 and 4 show performance of the comparative water-absorbing agent (4).

Comparative Example 5

Operations similar to those of Production Example 2 were carried out except that: an amount of a 10 mass % polyethyleneglycol diacrylate acrylic acid solution (molecular weight: 523) added was changed to 24.50 g (0.08 mol % relative to a carboxyl group-containing unsaturated monomer); an amount of an aqueous diethylenetriamine pentaacetic acid/trisodium (DTPA·3Na) solution added was changed from 1.29 g to 5.16 g (from 0.96 mmol % to 3.84 mmol % relative to the carboxyl group-containing unsaturated monomer); and no 50 mass % D,L-malic acid solution (manufactured by FUSO CHEMICAL CO., LTD., food additive grade) was added. A surface-crosslinked water-absorbing agent thus obtained was considered to be a comparative water-absorbing agent (5). Tables 3 and 4 show performance of the comparative water-absorbing agent (5).

Comparative Example 6

Operations similar to those of Production Example 2 were carried out except that: an amount of a 10 mass % polyethyleneglycol diacrylate acrylic acid solution (molecular weight: 523) added was changed to 27.56 g (0.09 mol % relative to a carboxyl group-containing unsaturated monomer); an amount of a 50 mass % D,L-malic acid solution (manufactured by FUSO CHEMICAL CO., LTD., food additive grade) added was changed from 1.55 g to 3.10 g (from 0.10 mol % to 0.20 mol % relative to the carboxyl group-containing unsaturated monomer); and no aqueous diethylenetriamine pentaacetic acid/trisodium (DTPA·3Na) solution was added. A surface-crosslinked water-absorbing agent thus obtained was considered to be a comparative water-absorbing agent (6). Tables 3 and 4 show performance of the comparative water-absorbing agent (6).

EXAMPLES

Example 1

Operations similar to those of Production Example 2 were carried out except that: an amount of a 10 mass % polyethyleneglycol diacrylate acrylic acid solution (molecular weight: 523) added was changed to 24.50 g (0.08 mol % relative to a carboxyl group-containing unsaturated monomer); no 50 mass % D,L-malic acid solution (manufactured by FUSO CHEMICAL CO., LTD., food additive grade) was added; and an amount of an aqueous diethylenetriamine pentaacetic acid/trisodium (DTPA·3Na) solution added was changed from 1.29 g to 10.32 g (from 0.96 mmol % to 7.68 mmol % relative to the carboxyl group-containing unsaturated monomer). A surface-crosslinked water-absorbing agent thus obtained was considered to be a water-absorbing agent (1). Tables 1 and 2 show performance of the water-absorbing agent (1).

Example 2

Operations similar to those of Production Example 2 were carried out except that: an amount of an aqueous diethylenetriamine pentaacetic acid/trisodium (DTPA·3Na) solution added was changed from 1.29 g to 5.16 g (from 0.96 mmol % to 3.84 mmol % relative to a carboxyl group-containing unsaturated monomer). A surface-crosslinked water-absorbing agent thus obtained was considered to be a water-absorbing agent (2). Tables 1 and 2 show performance of the water-absorbing agent (2).

Example 3

Operations similar to those of Production Example 2 were carried out except that: an amount of an aqueous diethylenetriamine pentaacetic acid/trisodium (DTPA·3Na) solution added was changed from 1.29 g to 2.58 g (from 0.96 mmol % to 1.92 mmol % relative to a carboxyl group-containing unsaturated monomer). A surface-crosslinked water-absorbing agent thus obtained was considered to be a water-absorbing agent (3). Tables 1 and 2 show performance of the water-absorbing agent (3).

Example 4

Operations similar to those of Production Example 2 were carried out except that: an amount of a 10 mass % polyethyleneglycol diacrylate acrylic acid solution (molecular weight: 523) added was changed to 28.79 g (0.090 mol % relative to a carboxyl group-containing unsaturated monomer); and an amount of a 50 mass % D,L-malic, acid solution (manufactured by FUSO CHEMICAL CO., LTD., food additive grade) added was changed from 1.55 g to 3.10 g (from 0.10 mol % to 0.20 mol % relative to the carboxyl group-containing unsaturated monomer). A surface-crosslinked water-absorbing agent thus obtained was considered to be a water-absorbing agent (4). Tables 1 and 2 show performance of the water-absorbing agent (4).

Example 5

Operations similar to those of Production Example 2 were carried out except that: an amount of a 10 mass % polyethyleneglycol diacrylate acrylic acid solution (molecular weight: 523) added was changed to 30.63 g (0.10 mol % relative to a carboxyl group-containing unsaturated monomer); an amount of a 50 mass % D,L-malic acid solution (manufactured by FUSO CHEMICAL CO., LTD., food additive grade) added was changed from 1.55 g to 4.13 g (from 0.10 mol % to 0.26 mol % relative to the carboxyl group-containing unsaturated monomer); and no aqueous diethylenetriamine pentaacetic acid/trisodium (DTPA·3Na) solution was added. A surface-crosslinked water-absorbing agent thus obtained was considered to be a water-absorbing agent (5). Tables 1 and 2 show performance of the water-absorbing agent (5).

Example 6

Operations similar to those of Production Example 2 were carried out except that: an amount of a 10 mass % polyethyleneglycol diacrylate acrylic acid solution (molecular weight: 523) added was changed to 32.16 g (0.105 mol % relative to a carboxyl group-containing unsaturated monomer); an amount of a 50 mass % D,L-malic acid solution (manufactured by FUSO CHEMICAL CO., LTD., food additive grade) added was changed from 1.55 g to 6.19 g (from 0.10 mol % to 0.40 mol % relative to the carboxyl group-containing unsaturated monomer); and an amount of an aqueous diethylenetriamine pentaacetic acid/trisodium (DTPA·3Na) solution added was changed from 1.29 g to 2.58 g (from 0.96 mmol % to 1.92 mmol % relative to the carboxyl group-containing unsaturated monomer). A surface-crosslinked water-absorbing agent thus obtained was considered to be a water-absorbing agent (6). Tables 1 and 2 show performance of the water-absorbing agent (6).

Example 7

Operations similar to those of Production Example 2 were carried out except that: an amount of a 10 mass % polyethyleneglycol diacrylate acrylic acid solution (molecular weight: 523) added was changed to 30.63 g (0.1 mol % relative to a carboxyl group-containing unsaturated monomer); no 50 mass % D,L-malic acid solution was added; 5.78 g (0.33 mol % relative to the carboxyl group-containing unsaturated monomer) of a 30 mass % aqueous lactic acid solution (a concentration of the 30 mass % aqueous lactic acid solution was adjusted with use of ion exchange water before use) was added; and an amount of an aqueous diethylenetriamine pentaacetic acid/trisodium (DTPA·3Na) solution added was changed from 1.29 g to 3.87 g (from 0.96 mmol % to 2.88 mmol % relative to the carboxyl group-containing unsaturated monomer). A surface-crosslinked water-absorbing agent thus obtained was considered to be a water-absorbing agent (7). Tables 1 and 2 show performance of the water-absorbing agent (7).

Example 8

Operations similar to those of Production Example 2 were carried out except that: an amount of a 10 mass % polyethyleneglycol diacrylate acrylic acid solution (molecular weight: 523) added was changed to 30.63 g (0.1 mol % relative to a carboxyl group-containing unsaturated monomer); no 50 mass % D,L-malic acid solution was added; 3.59 g (0.33 mol % relative to the carboxyl group-containing unsaturated monomer) of a 60 mass % aqueous sodium lactate solution (manufactured by PURAC) was added; and an amount of an aqueous diethylenetriamine pentaacetic acid/trisodium (DTPA·3Na) solution added was changed from 1.29 g to 3.87 g (from 0.96 mmol % to 2.88 mmol % relative to the carboxyl group-containing unsaturated monomer). A surface-crosslinked water-absorbing agent thus obtained was considered to be a water-absorbing agent (8). Tables 1 and 2 show performance of the water-absorbing agent (8).

Example 9

Operations similar to those of Production Example 2 were carried out except that: an amount of a 10 mass % polyethyleneglycol diacrylate acrylic acid solution (molecular weight: 523) added was changed to 30.63 g (0.1 mol % relative to a carboxyl group-containing unsaturated monomer); no 50 mass % D,L-malic acid solution was added; 4.88 g (0.33 mol % relative to the carboxyl group-containing unsaturated monomer) of a 30 mass % aqueous glycolic acid solution (manufactured by KANTO CHEMICAL CO., INC.; a concentration of the 30 mass % aqueous glycolic acid solution was adjusted with use of ion exchange water before use) was added; and an amount of an aqueous diethylenetriamine pentaacetic acid/trisodium (DTPA·3Na) solution added was changed from 1.29 g to 3.87 g (from 0.96 mmol % to 2.88 mmol % relative to the carboxyl group-containing unsaturated monomer). A surface-crosslinked water-absorbing agent thus obtained was considered to be a water-absorbing agent (9). Tables 1 and 2 show performance of the water-absorbing agent (9).

Example 10

In Production Example 2, after the surface-crosslinking, the surface-crosslinked water-absorbing agent was crushed until the surface-crosslinked water-absorbing agent passed through a JIS standard sieve having a mesh size of 850 µm. Thus, a surface-crosslinked water-absorbing agent (10''') was obtained. Into a 225-milliliter bottle, 30 g of the surface-crosslinked water-absorbing agent (10''') was put together with 10 g of marbles and then mixed by shaking for 10 minutes with use of a paint shaker (manufactured by Toyo Seiki Seisaku-sho, Ltd.), so that a surface-crosslinked water-absorbing agent (10'') was obtained. Thereafter, to 100 parts by mass of the surface-crosslinked water-absorbing agent (10''), an aqueous solution containing 1 part by mass of water and 0.01 parts by mass of diethylenetriamine pentaacetic acid/trisodium was added and mixed uniformly. Then, a resultant mixture was dried for 30 minutes at 60° C. After this drying treatment, the dried material was crushed until the dried material passed through a JIS standard sieve having a mesh size of 850 µm. Thus, a surface-crosslinked water-absorbing agent (10') was obtained. Into a 225-milliliter bottle, 30 g of the surface-crosslinked water-absorbing agent (10') was put together with 10 g of marbles and then mixed by shaking for 10 minutes with use of a paint shaker (manufactured by Toyo Seiki Seisaku-sho, Ltd.). A surface-crosslinked water-absorbing agent thus obtained was considered to be a water-absorbing agent (10). Tables 1 and 2 show performance of the water-absorbing agent (10).

Example 11

Operations similar to those of Example 8 were carried out except that: (1) an amount of a 60 mass % aqueous sodium lactate solution (manufactured by PURAC) added was changed from 3.59 g (0.33 mol % relative to a carboxyl group-containing unsaturated monomer) to 0.69 g (0.063 mol % relative to the carboxyl group-containing unsaturated monomer); (2) no aqueous diethylenetriamine pentaacetic acid/trisodium (DTPA·3Na) solution was added, and 5.16 g (4.04 mmol % relative to the carboxyl group-containing unsaturated monomer) of a 2.0 mass % aqueous ethylenediaminetetra (methylene phosphonate) (EDTMP) solution was added; (3) to an aqueous monomer solution (b') whose temperature had reached 39° C., nitrogen gas was introduced at a pressure of 0.1 MPa and at a flow rate of 0.1 L/min for 5 seconds with the use of Kinoshita glass ball filter (filter particle No. 4; manufactured by Kinoshita Rika Kogyo Co., Ltd.); (4) to 100 parts by mass of a water-absorbing agent (b) before surface-crosslinking, a surface-crosslinking agent solution containing 0.3 parts by mass of ethylene carbonate, 0.5 parts by mass of propylene glycol, 2.7 parts by mass of deionized water (ion exchange water), and 0.01 parts by mass of 10 mass % polyoxyethylene (20) sorbitan monostearate was added and mixed uniformly. A surface-crosslinked water-absorbing agent thus obtained was considered to be a water-absorbing agent (11). Tables 1 and 2 show performance of the water-absorbing agent (11).

Example 12

Operations similar to those of Example 8 were carried out except that: (1) an amount of a 60 mass % aqueous sodium lactate solution (manufactured by PURAC) added was changed from 3.59 g (0.33 mol % relative to a carboxyl group-containing unsaturated monomer) to 1.29 g (0.12 mol % relative to the carboxyl group-containing unsaturated monomer); (2) no aqueous diethylenetriamine pentaacetic acid/trisodium (DTPA·3Na) solution was added, and 5.16 g (4.74 mmol % relative to the carboxyl group-containing unsaturated monomer) of a 2.0 mass % aqueous ethylenediamine tetraacetic acid (EDTA) (manufactured by CHELEST CORPORATION; product name: CHELEST 3B) solution was added; (3) to 100 parts by mass of a water-absorbing agent (b) before surface-crosslinking, a surface-crosslinking agent solution containing 0.4 parts by mass of 1,4-butanediol, 0.6 parts by mass of propylene glycol, 2.8 parts by mass of deionized water (ion exchange water), and 0.01 parts by mass of 10 mass % polyoxyethylene (20) sorbitan monostearate was added and mixed uniformly. A surface-crosslinked water-absorbing agent thus obtained was considered to be a water-absorbing agent (12). Tables 1 and 2 show performance of the water-absorbing agent (12).

Example 13

Operations similar to those of Example 8 were carried out except that: (1) no aqueous diethylenetriamine pentaacetic acid/trisodium (DTPA·3Na) solution was added, and 5.16 g (4.99 mmol % relative to a carboxyl group-containing unsaturated monomer) of a 2.0 mass % aqueous 3-hydroxy-2,2'-iminodisuccinic acid tetrasodium (HIDS) (manufactured by Nippon Shokubai Co., Ltd.) solution was added; (2) at a point in time at which a temperature of an aqueous monomer solution (b') reached 39.3° C., 4.39 g of 1 mass % polyoxyethylene (20) sorbitan monostearate (manufactured by Kao Corporation) was added to the aqueous monomer solution (b'); (3) 18.4 g of a 4.5 mass % aqueous sodium persulfate solution was not added, and 14.01 g of a 5.9 mass % sodium persulfate was added; (4) a plate diameter at the time of crushing with use of a meat chopper was changed from 6.4 mm to 9.5 mm; (5) to 100 parts by mass of a water-absorbing agent (b) before surface-crosslinking, a surface-crosslinking agent solution containing 0.6 parts by mass of ethylene carbonate, 2.7 parts by mass of deionized water (ion exchange water), and 0.01 parts by mass of 10 mass % polyoxyethylene (20) sorbitan monostearate was added and mixed uniformly. A surface-crosslinked water-absorbing agent thus obtained was considered to be a water-absorbing agent (13). Tables 1 and 2 show performance of the water-absorbing agent (13).

Example 141

Operations similar to those of Example 3 were carried out except that: (1) 1.55 g of a 50 mass % D,L-malic acid solution (manufactured by FUSO CHEMICAL CO., LTD., food additive grade) was not added, and 1.12 g (0.10 mol % relative to a carboxyl group-containing unsaturated monomer) of a 60 mass % aqueous sodium lactate solution (manufactured by PURAC) was added; and (2) to 100 parts by mass of a water-absorbing agent (b) before surface-crosslinking, a surface-crosslinking agent solution containing 0.3 parts by mass of ethylene carbonate, 0.5 parts by mass of propylene glycol, 0.02 parts by mass of DENACOL, and 2.1 parts by mass of deionized water was added and mixed uniformly, and a time of a heating treatment at the time of surface-crosslinking was shortened by approximately 5 minutes. A surface-crosslinked water-absorbing agent thus obtained was considered to be a water-absorbing agent (14). Tables 1 and 2 show performance of the water-absorbing agent (14).

Example 15

In a similar manner to Example 2, operations up to classification were carried out. Then obtained were a water-absorbing agent (b) having a non-uniformly pulverized shape before surface-crosslinking that had passed through a sieve having a mesh size of 710 μm and remained on a sieve having a mesh size of 150 μm and fine powder (c-1) that had passed through the sieve having the mesh size of 150 μm.

Further, surface-crosslinking was carried out by a heating treatment similar to that of Example 2 except that: to 100 parts by mass of a water-absorbing agent (b) before surface-crosslinking, a surface-crosslinking agent solution containing 0.6 parts by mass of ethylene carbonate, 2.7 parts by mass of deionized water (ion exchange water), and 0.01 parts by mass of 10 mass % polyoxyethylene (20) sorbitan monostearate was added and mixed uniformly.

Then, this mixture was classified with use of two JIS standard sieves having respective mesh sizes of 710 μm and 150 μm. Obtained by this operation were a surface-crosslinked water-absorbing agent (d) that had passed through the sieve having the mesh size of 710 μm and remained on the sieve having the mesh size of 150 μm and fine powder (c-2) that had passed through the sieve having the mesh size of 150 μm.

Next, the fine powder (c-1) and the fine powder (c-2) were mixed in proportions of 17:3 (w:w), and a resulting mixture was considered to be fine powder (c-3). The fine powder (c-3) had D50 (mass average particle diameter) of 85 μm. Then, after 60 parts by mass of the fine powder (c-3) was heated to 70° C., the fine powder (c-3) was introduced into a food processor (MK-K48P; manufactured by Panasonic Corporation). 49 parts by mass of deionized water having a temperature adjusted to 80° C. was added to the fine powder (c-3) while being stirred. These substances were mixed for 30 seconds so that a granulated gel (c-3) was obtained.

Next, after 1 minute had passed since the commencement of the granulation, 80 parts by mass of the granulated gel (c-3) was added to 320 parts by mass of a particulate hydrogel (b) that had been prepared by carrying out the above-described operation in Example 2 again. Immediately after the addition, these substances were mixed for 10 seconds in a mortar mixer (manufactured by Nishinihon-shikenki) that had been heated to 80° C., so that a mixed gel (c-4) was obtained. Note that the temperature of the granulated gel (c-3) and the temperature of the particulate hydrogel (b) immediately before the granulated gel (c-3) and the particulate hydrogel (b) were mixed in the mortar mixer were 55° C. and 50° C., respectively. Further, mixability of the granulated gel (c-3) and the particulate hydrogel (b) in the mortar mixer was good.

Next, the mixed gel (c-4) was spread onto a metal gauze (50 mesh) and dried with hot air at 190° C. for 30 minutes. A dried material thus obtained was pulverized with use of a roll mill (WML-type roll pulverizer; manufactured by Ino-guchi Giken Ltd.). The dried material thus pulverized was classified with use of two JIS standard sieves having respective mesh sizes of 710 μm and 150 μm. Obtained by this operation was a water-absorbing agent (c-4) having a non-uniformly pulverized shape before surface-crosslinking that had passed through the sieve having the mesh size of 710 μm and remained on the sieve having the mesh size of 150 μm.

To 100 parts by mass of the water-absorbing agent (c-4) before surface-crosslinking, a surface-crosslinking agent solution containing 0.6 parts by mass of ethylene carbonate, 2.7 parts by mass of deionized water (ion exchange water), and 0.01 parts by mass of 10 mass % polyoxyethylene (20) sorbitan monostearate was added and mixed uniformly. After that, a mixture thus obtained was subjected to surface-crosslinking by a heating treatment at 200° C. for 35 minutes to 55 minutes.

Then, the mixture was classified with use of two JIS standard sieves having respective mesh sizes of 710 μm and 150 μm. Obtained by this operation was a surface-crosslinked water-absorbing agent (c-4) that had passed through the sieve having the mesh size of 710 μm and remained on the sieve having the mesh size of 150 μm. The surface-crosslinked water-absorbing agent (c-4) obtained by the above-described method was considered to be a water-absorbing agent (15). Tables 1 and 2 show performance of the water-absorbing agent (15).

<Test Result 1: Evaluation by Wearing by Monitors>

For comparison of a damp feel experienced by a wearer of a disposable diaper which had not absorbed urine, evaluation was carried out by monitors with use of the water-absorbing agent 1 of Example 1 and the comparative water-absorbing agent 1 of Comparative Example 1.

First, a polyethylene film having a width of 150 mm and a length of 500 mm was spread, and spray glue was sprayed onto a surface of the polyethylene film. Then, 20.0 g of a water-absorbing agent was uniformly spread over the polyethylene film and fixed. Further, 7.0 g of wood-ground pulp was spread onto the water-absorbing agent as uniformly as possible and fixed onto the polyethylene film. Thus obtained was a simulated absorbent body.

From a commercially available disposable diaper for adults, a back sheet (liquid impermeable sheet) made of a liquid-impermeable polypropylene and having a so-called leg gathering and a top sheet (liquid permeable sheet) made of a liquid permeable polypropylene were collected. Then, the simulated absorbent body was disposed such that a pulp side faces the top sheet and the polyethylene film faces the back sheet. The pulp side and the polyethylene film were each fixed with use of a double-sided tape, so that a simulated absorbent article (that is, a disposable diaper) was prepared. A simulated absorbent article in which the water-absorbing agent 1 of Example 1 was used was considered to be a simulated absorbent article 1, and a simulated absorbent article in which the comparative water-absorbing agent 1 of Comparative Example 1 was used was considered to be a comparative simulated absorbent article 1.

In a blind test, ten monitors were asked to wear the two simulated absorbent articles thus prepared. The monitors were asked to put on underwear and sweatpants over each of the simulated absorbent articles and walk for the first 10 minutes after the commencement of the test. Ten minutes after, the monitors were asked to report which one of the simulated absorbent articles had caused less damp feel or discomfort, on the basis of a relative comparison. The result is as follows.

[Comfortability Evaluation Result]

(1) The number of monitors who reported that the simulated absorbent article 1 was more comfortable: 7

(2) The number of monitors who reported that the comparative simulated absorbent article 1 was more comfortable: 1

(3) The number of monitors who did not know which one was more comfortable: 2

As indicated above, seven monitors among the 10 monitors answered that the absorbent article (simulated absorbent article 1) in which the water-absorbing agent having a high moisture absorbing speed caused less damp feel or discomfort. This indicates that, although walking for 10 minutes after starting to wear the simulated absorbent article is considered to have caused an increase in humidity inside the simulated absorbent article due to an increased body temperature and sweating, use of the water-absorbing agent having a high moisture absorbing speed allowed reducing discomfort to a relatively low level even though the absorbent body and the absorbent article had a low ratio of pulp.

<Test Result 2>

Evaluation results of Examples and Comparative Examples are shown in Tables 1 through 4 below.

|  | α-hydroxycarboxylic acid (salt) | | | Chelating agent | | Surface- | |
|---|---|---|---|---|---|---|---|
|  | Raw material | Added amount [mol %] | Extracted amount [mol %] | Added amount [mmol %] | Extracted amount [mmol %] | Surface treatment | crosslinked water-absorbing agent |
| Example 1 | None | 0 | 0 | 7.68 | 1.92 | HD/TEG | Water-absorbing agent (1) |
| Example 2 | Malic acid | 0.10 | 0.09 | 3.84 | 0.86 | HD/TEG | Water-absorbing agent (2) |
| Example 3 | Malic acid | 0.10 | 0.09 | 1.92 | 0.46 | HD/TEG | Water-absorbing agent (3) |
| Example 4 | Malic acid | 0.20 | 0.17 | 0.96 | 0.12 | HD/TEG | Water-absorbing agent (4) |
| Example 5 | Malic acid | 0.26 | 0.21 | 0 | 0 | HD/TEG | Water-absorbing agent (5) |
| Example 6 | Malic acid | 0.40 | 0.32 | 1.92 | 0.46 | HD/TEG | Water-absorbing agent (6) |
| Example 7 | Lactic acid | 0.33 | 0.27 | 2.88 | 0.65 | HD/TEG | Water-absorbing agent (7) |
| Example 8 | Sodium lactate | 0.33 | 0.31 | 2.88 | 0.63 | HD/TEG | Water-absorbing agent (8) |
| Example 9 | Glycolic acid | 0.33 | 0.27 | 2.88 | 0.69 | HD/TEG | Water-absorbing agent (9) |
| Example 10 | Malic acid | 0.10 | 0.09 | 0.96 +1.92 (added later) | 1.08 | HD/TEG | Water-absorbing agent (10) |
| Example 11 | Sodium lactate | 0.06 | 0.06 | 4.04 | 0.94 | EC/PG | Water-absorbing agent (11) |
| Example 12 | Sodium lactate | 0.12 | 0.11 | 4.74 | 1.13 | BD/PG | Water-absorbing agent (12) |
| Example 13 | Sodium lactate | 0.33 | 0.31 | 4.99 | 1.19 | EC | Water-absorbing agent (13) |
| Example 14 | Sodium lactate | 0.10 | 0.09 | 1.92 | 0.46 | D/EC/PG | Water-absorbing agent (14) |
| Example 15 | Malic acid | 0.10 | 0.09 | 3.84 | 0.86 | EC | Water-absorbing agent (15) |

| | Evaluation of physical properties | | | | Specific surface area [m²/kg] | Moisture absorbing speed (mg/g/h) Temperature 40° C. Relative humidity 75% | Change by coloration with lapse of time ΔWI/(0-7 d) Temperature 70° C. Relative humidity 75% | WI value before colorations acceleration test Temperature 70° C. Relative humidity 75% | Simulated absorbent body ΔWI/(0-7 d) Temperature 70° C. Relative humidity 75% |
|---|---|---|---|---|---|---|---|---|---|
| | CRC [g/g] | AAP0.7 [g/g] | SFC | FSR [g/g/s] | | | | | |
| Example 1 | 30.8 | 26.8 | 16 | 0.37 | 42.4 (Base 48.2) | 132.0 | 35.2 | 44.2 | — |
| Example 2 | 30.1 | 26.8 | 22 | 0.37 | 42.4 | 132.0 | 29.9 | 50.4 | — |
| Example 3 | 30.1 | 26.8 | 22 | 0.37 | 42.4 | 132.0 | 38.4 | 54.5 | — |
| Example 4 | 29.6 | 26.6 | 26 | 0.37 | 42.4 | 132.0 | 36.3 | 56.8 | — |
| Example 5 | 28.3 | 25.7 | 37 | 0.37 | 42.4 | 132.0 | 32.8 | 58.9 | — |
| Example 6 | 27.4 | 25.1 | 35 | 0.39 | 44.2 | 134.5 | 15.4 | 53.1 | — |
| Example 7 | 26.4 | 24.7 | 54 | 0.39 | 44.8 | 134.5 | 10.7 | 50.2 | 11.4 |
| Example 8 | 27.5 | 25.0 | 46 | 0.36 | 39.1 | 130.3 | 13.3 | 50.0 | — |
| Example 9 | 27.2 | 25.2 | 45 | 0.38 | 43.0 | 132.8 | 25.4 | 50.7 | — |
| Example 10 | 27.5 | 24.9 | 35 | 0.37 | 42.4 | 132.0 | 39.4 | 54.0 | — |
| Example 11 | 30.1 | 26.8 | 22 | 0.40 | 45.0 | 140.0 | 38.4 | 52.7 | — |
| Example 12 | 30.1 | 26.8 | 22 | 0.37 | 42.4 | 132.0 | 38.4 | 54.5 | — |
| Example 13 | 27.5 | 25.0 | 31 | 0.41 | 45.0 | 139.5 | 13.3 | 50.0 | — |
| Example 14 | 31.5 | 25.5 | 8 | 0.37 | 42.4 | 132.0 | 38.4 | 54.5 | — |
| Example 15 | 30.1 | 25.8 | 7 | 0.40 | 45.0 | 140.0 | 29.9 | 50.4 | — |

| | | α-hydroxycarboxylic acid (salt) | | Chelating agent | | | |
|---|---|---|---|---|---|---|---|
| | Raw material | Added amount [mol %] | Extracted amount [mol %] | Added amount [mmol %] | Extracted amount [mmol %] | Surface treatment | Surface-crosslinked water-absorbing agent |
| Comparative Example 1 | Malic acid | 0.10 | 0.09 | 0.96 | 0.15 | EC/PG/D | Comparative water-absorbing agent (1) |
| Comparative Example 2 | Malic acid | 0.10 | 0.09 | 0.96 | 0.15 | HD/TEG | Comparative water-absorbing agent (2) |
| Comparative Example 3 | Malic acid | 0.66 | 0.49 | 0.96 | 0.15 | HD/TEG | Comparative water-absorbing agent (3) |
| Comparative Example 4 | Malic acid | 0.46 | 0.34 | 0.96 | 0.12 | HD/TEG | Comparative water-absorbing agent (4) |
| Comparative Example 5 | None | 0 | 0 | 3.84 | 0.86 | HD/TEG | Comparative water-absorbing agent (5) |
| Comparative Example 6 | Malic acid | 0.20 | 0.17 | 0 | 0 | HD/TEG | Comparative water-absorbing agent (6) |

| | Evaluation of physical properties | | | | Specific surface area [m²/kg] | Moisture absorbing speed [mg/g/h] Temperature 40° C. Relative humidity 75% | Change by coloration with lapse of time ΔWI/(0-7 d) Temperature 70° C. Relative humidity 75% | WI value before colorations acceleration test Temperature 70° C. Relative humidity 75% | Simulated absorbent body Temperature 70° C. Relative humidity 75% |
|---|---|---|---|---|---|---|---|---|---|
| | CRC [g/g] | AAP0.7 [g/g] | SFC | FSR [g/g/s] | | | | | |
| Comparative Example 1 | — | — | — | 0.27 | 28.5 (Base 30.7) | 114.9 | 36.9 | 56.3 | — |

-continued

|  | Evaluation of physical properties | | | Specific surface area [m²/kg] | Moisture absorbing speed [mg/g/h] Temperature 40° C. Relative humidity 75% | Change by coloration with lapse of time ΔWI/(0-7 d) Temperature 70° C. Relative humidity 75% | WI value before colorations acceleration test Temperature 70° C. Relative humidity 75% | Simulated absorbent body ΔWI/(0-7 d) Temperature 70° C. Relative humidity 75% |
|---|---|---|---|---|---|---|---|---|
|  | CRC [g/g] | AAP0.7 [g/g] | SFC | FSR [g/g/s] | | | | |
| Comparative Example 2 | 27.1 | 24.7 | 41 | 0.39 | 44.9 (Base 48.2) | 135.4 | 42.7 | 56.7 | — |
| Comparative Example 3 | 27.3 | 24.0 | 28 | 0.37 | 42.4 | 132.0 | 20.1 | 57.3 | — |
| Comparative Example 4 | 27.6 | 24.5 | 29 | 0.37 | 42.4 | 132.0 | 26.9 | 55.5 | — |
| Comparative Example 5 | 30.8 | 26.8 | 16 | 0.37 | 42.4 | 132.0 | 42.1 | 48.1 | 29.3 |
| Comparative Example 6 | 29.6 | 26.6 | 26 | 0.37 | 42.4 | 132.0 | 40.6 | 58.9 | — |

As shown in Tables 1 through 4, it was found that a water-absorbing agent in accordance with an aspect of the present invention, although having a large specific surface area, achieves, in a balanced manner, both good physical properties and a decrease in speed of coloration with lapse of time.

For example, it is indicated from Comparative Example 1 and Comparative Example 2 that a speed of coloration increases in accordance with an increase in specific surface area of the water-absorbing agent and a resultant increase in moisture absorbing speed. It is indicated from Comparative Examples 3 and 4 that an increase in amount of the α-hydroxycarboxylic acid (salt) added decreases the speed of coloration but deteriorates physical properties. It is indicated from Examples 1 through 5 that adjusting a balance between an amount of the α-hydroxycarboxylic acid (salt) added and an amount of the aminocarboxylic acid-based chelating agent added allows reducing the speed of coloration while maintaining good physical properties. Comparative Examples 5 and 6 also achieved maintaining good physical properties by adjusting a balance between an amount of the α-hydroxycarboxylic acid (salt) added and an amount of the aminocarboxylic acid-based chelating agent added, but did not achieve an improve in speed of coloration. It is indicated from Examples 7 through 9 that the speed of coloration is reduced regardless of the type of α-hydroxycarboxylic acid (salt). It is indicated from Example 10 that, even in a case where the aminocarboxylic acid-based chelating agent is added later, the speed of coloration decreases provided that an amount of the α-hydroxycarboxylic acid (salt) added and an amount of the aminocarboxylic acid-based chelating agent added do not exceed an optimal range.

It is indicated from Example 11 that, even in a case where the aminocarboxylic acid-based chelating agent is changed to a phosphorus-based chelating agent, it is possible to reduce the speed of coloration while maintaining good physical properties. It is indicated from Examples 12 and 13 that the speed of coloration is reduced regardless of the type of aminocarboxylic acid-based chelating agent. It is indicated from Example 15 that, even in a case where the water-absorbing agent contains a granulated material obtained by recycling fine powder generated during the process of producing the water-absorbing agent, it is possible to reduce the speed of coloration while maintaining good physical properties.

As shown in Tables 1 and 2, it was confirmed from Comparative Example 5 and Example 7 that a sufficient difference in coloration property is observed also between simulated absorbent bodies which are designed in consideration of actual use, as with between cases where water-absorbing agents are used alone.

As indicated in <Test result 1: evaluation by wearing by monitors> above, seven monitors among the 10 monitors answered that the absorbent article (simulated absorbent article 1) in which the water-absorbing agent having a high moisture absorbing speed caused less damp feel or discomfort. This indicates that, although walking for 10 minutes after starting to wear the simulated absorbent article is considered to have caused an increase in humidity inside the simulated absorbent article due to an increased body temperature and sweating, use of the water-absorbing agent having a high moisture absorbing speed allowed reducing discomfort to a relatively low level even though the absorbent body and the absorbent article had a low ratio of pulp.

FIG. 1 is a graph showing a relationship between an amount of α-hydroxycarboxylic acid (salt) extracted and an amount of an aminocarboxylic acid-based chelating agent and/or a phosphorus-based chelating agent extracted in accordance with Examples and Comparative Examples. In FIG. 1, the constant function $x_1=0.33$ and the quadratic function $y_1=28.7x_1^2-11.1x_1+1.07$ each indicate a boundary of performance (physical properties or coloration with lapse of time) to be satisfied in order to put a water-absorbing agent to actual use. Among the Examples and the Comparative Examples, it is the water-absorbing agents of Comparative Examples 3 and 4 that are plotted on a right side of the constant function. Thus, this region is considered to be a region in which the physical properties are poor. Further, it is the water-absorbing agents of Comparative Examples 2, 5, and 6 that are plotted on a lower side of the quadratic function. Thus, this region is considered to be a region in which the speed of coloration with lapse of time is high.

Figure 2:
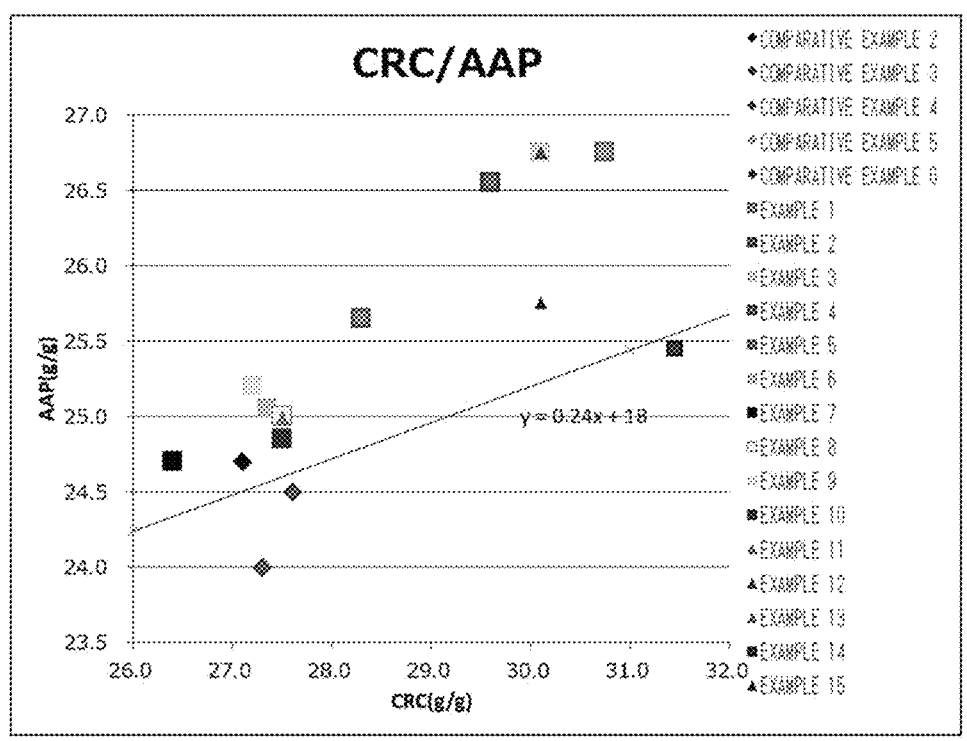
FIG. 2 shows graphs respectively indicating "CRC/AAP" and "CRC/SFC" of a water-absorbing agent in accordance with the Examples and the Comparative Examples of the present invention.
Figure 2:
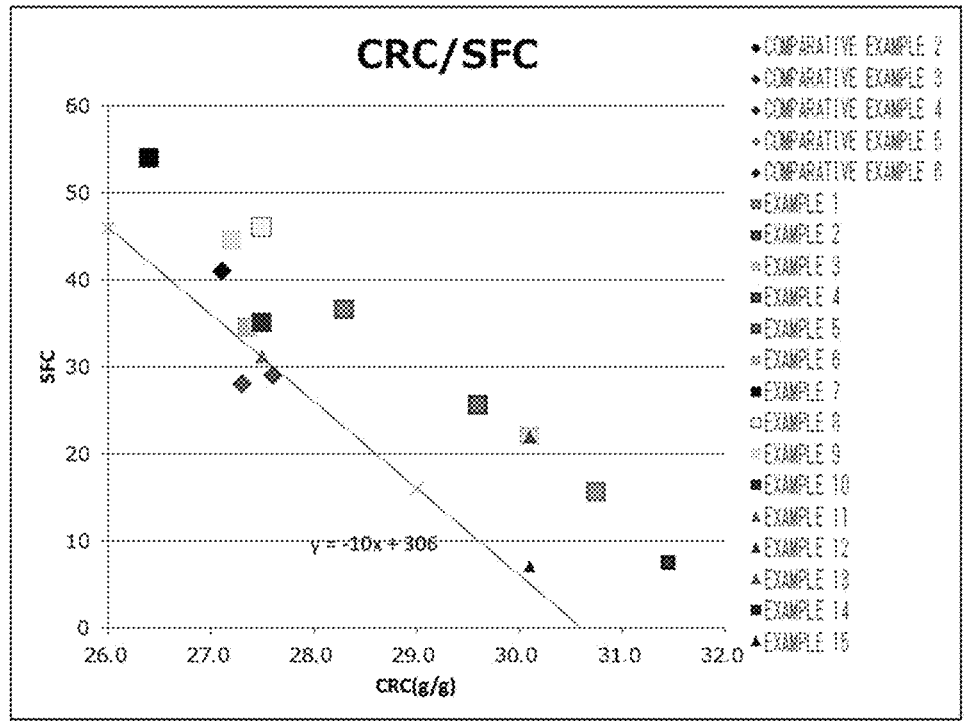

FIG. 2 shows graphs respectively indicating "CRC/AAP" and "CRC/SFC" of a water-absorbing agent in accordance with the Examples and the Comparative Examples. The physical properties of a water-absorbing agent can be evaluated more accurately by evaluating "CRC/AAP" and/or "CRC/SFC" rather than evaluating CRC, AAP, and SFC individually.

In each of the graphs indicating "CRC/AAP" and the graph indicating "CRC/SFC", a linear function is shown. This linear function indicates a boundary of performance to be satisfied in order to put a water-absorbing agent to actual use. A water-absorbing agent whose physical properties are plotted on a lower side of this straight line is considered to have poor physical properties.

Water-absorbing agents described in Examples of Patent Literature 2 (WO2017/170604), were prepared, and a specific surface area of each of the water-absorbing agents before surface-crosslinking was measured. As a result, even a water-absorbing agent having the largest specific surface area among the water-absorbing agents in Patent Literature 2 had a specific surface area of 30 m²/kg before surface-crosslinking (Example 20 in Patent Literature 2), and the water-absorbing agents in the other Examples each had a specific surface area of less than 32 m²/kg before surface-crosslinking. In an embodiment of the present invention, in order to impart a sufficient humidity adjusting function to an absorbent body for use in a thin disposable diaper, it is necessary to control a specific surface area of a water-absorbing agent before surface-crosslinking to be 32 m²/kg or more. As such, the water-absorbing agents in Patent Literature 2 are not suitable for use in a thin disposable diaper. In other words, there is no prior art that can control a specific surface area of a water-absorbing agent before surface-crosslinking to the levels of an embodiment of the present invention. Further, the prior art documents do not recognize the problem to be solved in the present invention that increasing a specific surface area of a water-absorbing agent causes an increase in moisture absorbing speed and thus an increase in speed of coloration with lapse of time.

INDUSTRIAL APPLICABILITY

A water-absorbing agent in accordance with an embodiment of the present invention can be suitably used in, for example, a disposable diaper. Further, the water-absorbing agent in accordance with an embodiment of the present invention can be suitably used in various applications such as absorbent articles (sanitary napkins, incontinence pads, etc.) including disposable diapers, agricultural and horticultural water retaining agents, and industrial waterproofing agents.

The invention claimed is:

1. An absorbent body, comprising a hydrophilic base material and a water-absorbing agent,
  said water-absorbing agent containing surface-crosslinked water-absorbing resin particles having a non-uniformly pulverized shape,
  a point plotted along an x-axis that represents an amount ($x_1$ mol %) of α-hydroxycarboxylic acid (salt) extracted from said water-absorbing agent and along a y-axis that represents an amount ($y_1$ mmol %) of an aminocarboxylic acid-based chelating agent and/or a phosphorus-based chelating agent extracted from said water-absorbing agent being within a range defined by (a) or (b) below,
  said water-absorbing agent having a specific surface area of 32 m²/kg or more,
  (a) $0 \leq x_1 < 0.19$ and both of the following Formulae (1) and (2) are satisfied:

$$y_1 > 28.7x_1^2 - 11.1x_1 + 1.07 \qquad \text{Formula(1)}$$

$$y_1 \geq 0 \qquad \text{Formula (2)}$$

(b) $0.19 \leq x_1 \leq 0.33$ and the following Formula (2) is satisfied:

$$y_1 \geq 0 \qquad \text{Formula (2)}.$$

2. A water-absorbing agent, comprising surface-crosslinked water-absorbing resin particles having a non-uniformly pulverized shape,
  a point plotted along an x-axis that represents an amount ($x_1$ mol %) of α-hydroxycarboxylic acid (salt) extracted from said water-absorbing agent and along a y-axis that represents an amount ($y_1$ mmol %) of an aminocarboxylic acid-based chelating agent and/or a phosphorus-based chelating agent extracted from said water-absorbing agent being within a range defined by (a) or (b) below,
  said water-absorbing agent having a specific surface area of 32 m²/kg or more,
  (a) $0 \leq x_1 < 0.19$ and both of the following Formulae (1) and (2) are satisfied:

$$y_1 > 28.7x_1^2 - 11.1x_1 + 1.07 \qquad \text{Formula(1)}$$

$$y_1 \geq 0 \qquad \text{Formula (2)}$$

(b) $0.19 \leq x_1 \leq 0.33$ and the following Formula (2) is satisfied:

$$y_1 \geq 0 \qquad \text{Formula (2)}.$$

3. A method for producing a water-absorbing agent containing surface-crosslinked water-absorbing resin particles having a non-uniformly pulverized shape, said method comprising:
  a preparation step of preparing an aqueous monomer solution containing a monomer and at least one polymerizable internal crosslinking agent, the monomer containing acrylic acid (salt) as a main component,
  the preparation step including: adding, to the aqueous monomer solution, α-hydroxycarboxylic acid (salt), and an aminocarboxylic acid-based chelating agent and/or a phosphorus-based chelating agent such that a point plotted along an x-axis that represents an amount ($x_1$ mol %) of the α-hydroxycarboxylic acid (salt) extracted from the water-absorbing agent and along a y-axis that represents an amount ($y_1$ mmol %) of the aminocarboxylic acid-based chelating agent and/or the phosphorus-based chelating agent extracted from the water-absorbing agent is within a range defined by (a) or (b) below; and adjusting the water-absorbing agent to have a specific surface area of 32 m²/kg or more,
  (a) $0 \leq x_1 < 0.19$ and both of the following Formulae (1) and (2) are satisfied:

$$y_1 > 28.7x_1^2 - 11.1x_1 + 1.07 \qquad \text{Formula(1)}$$

$$y_1 \geq 0 \qquad \text{Formula (2)}$$

(b) $0.19 \leq x_1 \leq 0.33$ and the following Formula (2) is satisfied:

$$y_1 \geq 0 \qquad \text{Formula (2)}.$$

4. The absorbent body according to claim 1, wherein a ratio of a mass of said water-absorbing agent to a mass of said absorbent body is 75 mass % or more and 99% by mass or less.

5. An absorbent article, comprising an absorbent body recited in claim 1.

6. The water-absorbing agent according to claim 2, wherein an amount of change between a WI value before a colorations acceleration test and a WI value after the colorations acceleration test is 40 or less, and the WI value before the colorations acceleration test is 42 or more, the WI value being expressed by the following formula:

$$\Delta WI(\text{amount of change}) = |WI(\text{color tone with lapse of time:after colorations acceleration test}) - WI(\text{initial color tone:before colorations acceleration test})|,$$

the colorations acceleration test being a test in which said water-absorbing agent is exposed for 7 days in an environment where a temperature is 701° C. and a relative humidity is 75±1% RH, in a case where the water-absorbing agent is a water-absorbing agent immediately after production or before shipment from a factory or in a case where the water-absorbing agent is a water-absorbing agent stored for 1 year or less after production in an atmosphere in which an air temperature is 30° C. or less and a relative humidity is 50% RH, a color of the water-absorbing agent was regarded as an initial tone color, in a case where the water-absorbing agent is a water-absorbing agent after the colorations acceleration test, a color of the water-absorbing agent is regarded as a color tone with a lapse of time.

7. The water-absorbing agent according to claim 2, wherein said water-absorbing agent satisfies a relational formula of Formula (3) and/or a relational formula of Formula (4):

$$y_2 \geq 0.24 x_2 + 18 \tag{3}$$

$$z_2 \geq -10 x_2 + 306 \tag{4}$$

where $x_2$ represents CRC, $y_2$ represents AAP, $z_2$ represents SFC, and $x_2$ is a value of 26 or more and 32 or less.

8. The method according to claim 3, further comprising the step of:

in a case where the respective amounts of the α-hydroxycarboxylic acid (salt), and the aminocarboxylic acid-based chelating agent and/or the phosphorus-based chelating agent extracted from the water-absorbing agent containing the surface-crosslinked water-absorbing resin particles having the non-uniformly pulverized shape are not in the range defined by (a) or (b) below, adding the α-hydroxycarboxylic acid (salt), and the aminocarboxylic acid-based chelating agent and/or the phosphorus-based chelating agent to the water-absorbing agent such that the amounts are within the range, (a) $0 \leq x_1 < 0.19$ and both of the following Formulae (1) and (2) are satisfied:

$$y_1 > 28.7 x_1^2 - 11.1 x_1 + 1.07 \tag{Formula (1)}$$

$$y_1 \geq 0 \tag{Formula (2)}$$

(b) $0.19 \leq x_1 \leq 0.33$ and the following Formula (2) is satisfied:

$$y_1 \geq 0 \tag{Formula (2).}$$

9. The method according to claim 3, further comprising the step of:

controlling a specific surface area of the water-absorbing agent before surface-crosslinking to be 32 m²/kg or more.

* * * * *